US010625389B2

(12) United States Patent
Cormier et al.

(10) Patent No.: US 10,625,389 B2
(45) Date of Patent: Apr. 21, 2020

(54) DEVICE FOR BLOCKING WORKPIECES, PARTICULARLY SPECTACLE LENSES, FOR THE PROCESSING AND/OR COATING THEREOF

(71) Applicant: Satisloh AG, Baar (CH)

(72) Inventors: Alexandre Cormier, Giessen (DE); Holger Schäfer, Weilmünster (DE); Steffen Wallendorf, Wetzlar-Dutenhofen (DE)

(73) Assignee: Satisloh AG, Baar (CH)

( * ) Notice: Subject to any disclaimer, the term of this patent is extended or adjusted under 35 U.S.C. 154(b) by 325 days.

(21) Appl. No.: 15/519,699

(22) PCT Filed: Oct. 7, 2015

(86) PCT No.: PCT/EP2015/001969
§ 371 (c)(1),
(2) Date: Apr. 17, 2017

(87) PCT Pub. No.: WO2016/058676
PCT Pub. Date: Apr. 21, 2016

(65) Prior Publication Data
US 2017/0239774 A1    Aug. 24, 2017

(30) Foreign Application Priority Data
Oct. 16, 2014    (DE) .................. 10 2014 015 200

(51) Int. Cl.
*B24B 13/005*    (2006.01)
(52) U.S. Cl.
CPC ........ *B24B 13/005* (2013.01); *B24B 13/0055* (2013.01)
(58) Field of Classification Search
CPC . B24B 13/0055; B24B 13/005; B24B 41/005; B24B 5/335
See application file for complete search history.

(56) References Cited

U.S. PATENT DOCUMENTS 1,727,889 A * 9/1929 McCabe ............... B24B 13/005
33/28
2,573,668 A * 10/1951 McCar .................. B24B 13/005
33/507
(Continued)

FOREIGN PATENT DOCUMENTS

| CN | 2291992 Y | 9/1998 |
| EP | 1093907 A2 | 4/2001 |
| EP | 3009230 | 4/2016 |

OTHER PUBLICATIONS

European Search Report; No. PCT/EP2015/001969 dated Feb. 22, 2016; 12 pages.
(Continued)

*Primary Examiner* — Timothy V Eley
*Assistant Examiner* — Marcel T Dion
(74) *Attorney, Agent, or Firm* — Reising Ethington P.C.

(57) ABSTRACT

A device for blocking workpieces has an aligning station that includes a workpiece support for aligning a workpiece. A blocking station comprises a block piece mount and serves to block the aligned workpiece by use of a block material on a block piece, which can be mounted in the block piece mount in a centered manner in relation to a substantially vertically extending blocker axis. A workpiece carriage carries a holding head for the workpiece and is suitably guided and driven to transport the workpiece from the aligning station to the blocking station to position the workpiece along the blocker axis in a defined manner relative to the block piece held in the block piece mount, and to hold the workpiece during blocking in the defined relative position to the block piece with a gap between workpiece and body piece.

20 Claims, 17 Drawing Sheets

(56) References Cited

U.S. PATENT DOCUMENTS

| | | | |
|---|---|---|---|
| 2,580,507 A | 1/1952 | Bernheim et al. | |
| 4,502,909 A | 3/1985 | Tomesko | |
| 4,543,752 A | 10/1985 | Kötting | |
| 4,977,675 A * | 12/1990 | Jewett, Sr. | B24B 13/0055 33/28 |
| 5,498,200 A | 3/1996 | Werner | |
| 5,720,647 A | 2/1998 | Gottschald | |
| 6,056,633 A | 5/2000 | Sesena et al. | |
| 7,324,190 B2 | 1/2008 | Demarchi et al. | |
| 7,338,558 B2 | 3/2008 | Bergandy et al. | |
| 8,616,150 B2 | 12/2013 | Savoie et al. | |
| 8,905,388 B2 | 12/2014 | Breme et al. | |
| 2004/0046960 A1* | 3/2004 | Wagner | B24B 13/005 356/399 |
| 2005/0139309 A1 | 6/2005 | Savoie et al. | |
| 2005/0173046 A1* | 8/2005 | Savoie | B24B 13/005 156/101 |
| 2007/0232194 A1* | 10/2007 | Matsuyama | A61B 5/0408 451/5 |
| 2011/0067628 A1* | 3/2011 | Savoie | B24B 13/005 118/500 |
| 2011/0084433 A1* | 4/2011 | Fiedler | B24B 41/005 269/56 |
| 2013/0316624 A1* | 11/2013 | Diehl | B24B 13/0055 451/246 |
| 2014/0272176 A1 | 9/2014 | Pugh et al. | |
| 2014/0315472 A1* | 10/2014 | Schneider | B24B 13/0055 451/42 |

OTHER PUBLICATIONS

German Office Action; Applicant: Satisioh AG; Appln. No. 10 2014 015 200.6; dated Sep. 22, 2015.

Chinese Office Action; Applicant: Satisloh AG; Application No. 201580068184.8; dated Jun. 25, 2018; 10 Pages.

\* cited by examiner

DEVICE FOR BLOCKING WORKPIECES, PARTICULARLY SPECTACLE LENSES, FOR THE PROCESSING AND/OR COATING THEREOF

TECHNICAL FIELD

The present invention relates generally to a device for blocking workpieces for processing and/or coating thereof, wherein the block serves the purpose of holding the workpiece in the respective processing machine and/or coating installation.

In particular, the invention relates to a device for blocking spectacle lenses—also commonly referred to as a blocker for short in this field—which are to be blocked on a large scale in so-called "prescription workshops" or "RX workshops" before the respective blocked spectacle lens is subjected to material-removing processing at its back or front surface with respect to its optical effect (in a given case according to prescription) and/or at the edge for fitting in an associated spectacle frame by geometrically defined cutting (milling/turning) and/or geometrically undefined cutting (grinding/polishing) and/or is coated on its back or front surface so as to achieve additional effects (increase in scratch resistance, anti-reflection characteristics, vapor deposition, hydrophobic characteristics, etc.).

When in the following there is discussion generally of "spectacle lenses" in connection with the present invention as preferred field of use there is to be understood that the term includes optical lenses or lens blanks for spectacles of conventional materials, for example polycarbonate, mineral glass, CR 39, HI-index, and other plastic material and with any starting shape of the circumferential edge of the lens or lens blank, which prior to blocking may already be processed and/or coated at one or both of the optically effective surfaces and/or at the edge. In addition, the spectacle lens can be provided on the surface thereof at which it is blocked with a film, lacquer or the like to protect this surface from soiling and damage and/or to improve the adhesion characteristics between spectacle lens and blocking material, without this being specifically mentioned hereunder on each occasion.

BACKGROUND OF THE INVENTION

A device for blocking spectacle lenses is generally known from document U.S. Publication No. 2005/0139309. The device comprises an imaging/aligning station, a measuring station and a blocking station generally in an arrangement alongside one another or in succession, between which stations the spectacle lenses can be automatically transported by a transport system with a spectacle lens mounting head. The imaging/aligning station has a geometrically defined spectacle lens support on which a supported spectacle lens to be blocked can be manually aligned by rotation and/or displacement as desired or as required per prescription. The aligned spectacle lens to be blocked can be mechanically measured in the measuring station at its face at which it is to be blocked. On the other hand, the blocking station has a block piece mount in which a block piece or blocking ring is mounted in centered manner before the aligned spectacle lens is blocked on the block piece by the mentioned face by using a temporarily deformable blocking material, here an optically hardenable adhesive.

The transport system is in that case in a position of gripping and holding the spectacle lens, which is aligned in the imaging/aligning station, at its other face by the spectacle lens mounting head, then bringing it into a defined position above the measuring station and later the blocking station (horizontal CNC linear axis) and lowering the aligned spectacle lens in a defined manner at the respective station (vertical CNC linear axis) for it to be measured or blocked on the block piece. In that regard, a feature is that the spectacle lens is positioned by the transport system in defined manner, i.e. at any preselectable height above the block piece, and during the blocking can be held in the defined relative position with respect to the block piece while leaving a blocking material receiving gap between spectacle lens and block piece (also termed "spatial blocking").

A significant advantage of this procedure is that the spectacle lens can be freely positioned in three dimensions in relation to the block piece, thus during blocking never experiences constrained orientation by the block piece, as a result of which also accuracy during blocking of the spectacle lens is increased. The latter concerns, in particular, progressive lenses often referred to as PALs, in which it can be very difficult to correctly set these if they are supported on conventional circular blocking rings, because the progressive curve is not spherical and the spectacle lens is thus not seated fully or is seated loosely on the blocking ring. On the other hand, in the case of "spatial blocking" it is possible to realize in problem-free manner, for example, a desired angular orientation, tilting and/or displacement of the spectacle lens relative to the block piece for, for example, prismatic blocking. In addition, the thickness of the layer of blocking material or adhesive between spectacle lens and block piece is basically freely selectable in the case of "spatial blocking" so that, for example, there is avoidance of the risk of no blocking material being present at specific locations between spectacle lens and block piece because the blocking material could not reach there. In this way, a whole-area support and adhesion/glueing of the spectacle lens can be guaranteed for processing of the blocked spectacle lens at the surface and/or edge. Equally, it is possible to avoid undesired free gaps between spectacle lens and block piece in which liquid, in a given case as the consequence of capillary effects, could collect, which can lead to problems during coating (outgassing under vacuum) if the spectacle lens in the production process is to remain throughout on the block piece, such as described in, for example, document U.S. Pat. No. 8,905,388.

In addition, it was proposed in document U.S. Pat. No. 8,616,150 to develop the relevant category of prior art—also in the sense of widest possible automation of the blocking process for production of spectacle lenses on an industrial scale—in such a way that the transport system is in a position of positioning the spectacle lens, which is to be blocked, not only in two directions, but fully in three dimensions, before it is blocked on the block piece. However, this requires six CNC movement axes, namely three CNC linear axes substantially perpendicular to one another and three CNC rotational or tilt axes about these linear axes.

However, such CNC blockers—even with only two CNC movement axes—represent a substantial capital cost, need a relatively large installation area and as such are overdimensioned for smaller prescription workshops as determined by reference to the spectacle lens throughput thereof.

Obviously, smaller blockers have already been proposed—see, for example, document U.S. Publication No. 2014/0315472—which are accordingly more advantageous and also require only a comparatively small installation area. However, in this prior art the spectacle lenses to be blocked are aligned at the block piece, which significantly restricts the possible relative settings of the spectacle lens with respect to the block piece. Shape-adapted block pieces were created here as a remedy, but this is with considerable outlay with respect to production and stocking of the different block pieces. Genuine "spatial blocking" in the above sense is not possible with these prior art blockers.

Accordingly, it is desired to create a simplest and most economic and compact device possible for the blocking of workpieces, particularly spectacle lenses, for processing and/or coating thereof even in smaller workshops, in which the workpiece is not subject to any significant restrictions with respect to its position relative to the block piece.

SUMMARY OF THE INVENTION

According to one aspect of the invention a device for blocking workpieces, particularly spectacle lenses, for processing and/or coating thereof comprises an aligning station, which has a workpiece support, for aligning a workpiece supported in the workpiece support. A blocking station is provided, which comprises a block piece mount and in which the aligned workpiece can be blocked by a temporarily deformable blocking material on a block piece, which can be mounted in the block piece mount to be centered with respect to a substantially vertically extending blocker axis. A suitably guided and driven workpiece carriage carries a holding head for the workpiece and transports the aligned workpiece held at the holding head from the aligning station to the blocking station, positions the workpiece in defined manner along the blocker axis relative to the block piece disposed in the block piece mount and during the blocking holds the workpiece in the defined relative position with respect to the block piece while leaving a blocking material receiving gap between workpiece and block piece. The aligning station is movable from a rest position, in which it does not obstruct movements of the workpiece carriage, to a work position, in which the workpiece support is centered with respect to the blocker axis, and vice versa.

In other words, the device according to one aspect of invention has only one, substantially vertically extending blocker axis which is thus advantageously aligned with respect to the application of the temporarily deformable blocking material taking place under the influence of gravitational force. The block piece mount is aligned with the blocker axis for centered mounting of the block pieces. Along the blocker axis, the workpiece held at the holding head and to be blocked not only can be transported from the aligning station to the blocking station, but also can be positioned above the block piece in the block piece mount. Thus, by contrast to the relevant prior art the workpiece no longer has to be horizontally moved and certainly not in a precise manner in order to arrive in a clearly defined horizontal position above the block piece.

A horizontal movement axis for the workpiece and in a given case positioning errors connected therewith are thus entirely eliminated in accordance with one aspect of the invention; merely the workpiece carriage vertically positions the workpiece with respect to the block piece in the block piece mount. By comparison with the prior art defining the category, this also gives rise to a need for only a small installation area for the device and in addition is conducive to a construction, which is simpler and more economic by comparison with the relevant prior art, of the device with only a few components. Partial automation of the blocking process is equally possible without problems in this kinematic construction.

At the same time, according to the invention and by contrast with the "small" blockers according to the above-mentioned prior art any constrained orientation of the workpiece by the block piece is avoided. Support or contact of the workpiece on or with the block piece does not take place either during alignment of the workpiece or during the actual blocking process, because an aligning station different from the blocking station is provided for the alignment and at the blocking station the workpiece carriage makes it possible for the workpiece retained at the holding head to be held at a spacing above the block piece, as a result of which "spatial blocking" is possible without problems.

In addition, with execution as a vertical CNC linear axis it is possible with workpiece carriage and holding head on the blocker axis to operate in programmed manner with a speed profile matched to the rheological characteristics for example, viscosity, thixotropy or rheopexy of the blocking material so as to optimize the process of pressing the workpiece into the blocking material with respect to the required amount of time and with respect to the lowest possible forces then acting on the workpiece. The temporarily deformable blocking material can in principle also be—apart from adhesives hardenable by use of light, particularly ultraviolet light—thermoplastic adhesives which can be applied by way of proprietary temperature-controlled metering units for hot-melt adhesives to the respective block piece. The blocker piece is then suitably cooled in the block piece mount. Other adhesives, for example reaction resin adhesives, for example two-component epoxy resin adhesives, can be used in appropriately suitable dispensers.

In order that during transport and positioning of the workpiece, which is held on a holding head, on the blocker axis the aligning station is not in the way of the workpiece carriage or the holding head carried by that, according to on aspect of the invention the aligning station can be moved away from the blocker axis, which can be realized in very expeditious manner by, for example, an uncontrolled linear or pivot movement of the aligning station onto end abutments.

Thus, in a preferred embodiment of the invention the aligning station is mounted on a suitably guided station carriage movable transversely to the blocker axis. By comparison with an equally conceivable pivotation or folding away of the aligning station from the blocker axis a transverse movement relative to the blocker axis has the advantage that a work position, which is precisely aligned with the blocker axis, of the aligning station is simpler to set.

In that case, the station carriage for the aligning station can be axially guided at substantially horizontally extending guide rods and movable by use of a pneumatic cylinder onto end abutments which define the rest and work positions. Such an embodiment is particularly favorable in cost by comparison with equally possible linear guides with rails and carriages running thereon. Moreover, rod guides are not susceptible to dirt and can be mounted at one end. The use of a pneumatic cylinder for displacement of the station carriage makes possible, by comparison with manual actuation of the station carriage conceivable as an alternative, expeditious automation of the actual blocking process after alignment of the workpiece.

In order to make possible an expeditious and economic defined prismatic blocking particularly without special CNC rotational or tilt axes as in the prior art outlined in the introduction, the workpiece support can be formed by a prism ring, which—from a plurality of differently chamfered prism rings—is exchangeably mounted at the aligning station and can be oriented in rotational angle about the blocker axis by use of a scale ring fixedly mounted at the aligning station.

In addition, in a preferred embodiment the block piece mount can be constructed for mechanically positive mounting of the block piece and can be rotatable in the blocking station in defined manner about the blocker axis by use of a setting ring with a scale, which in turn allows very expeditious and economic precise rotational angle orientation of the block piece with respect to the blocker axis.

In further pursuit of another aspect of the invention a camera can also be mounted on the station carriage which can film the workpiece supported on the workpiece support of the aligning station along the blocker axis by way of a deflecting mirror, which is similarly mounted on the station carriage, when the aligning station is in its work position. At the outset, the use of a camera has the advantage that an alignment, which is free of parallax errors, of the workpiece on the workpiece support is possible because the camera can film along the blocker axis. The alignment is then possible with PC assistance in particularly convenient manner, in which the image of the camera is superimposed on an alignment marking generated by computer and is displayed on a display screen. In principle, it would in fact also be conceivable to move or pivot such a camera separately in the blocker axis. On the other hand, however, an arrangement of the camera with a deflecting mirror at the station carriage is particularly advantageous because on the one hand specific measures do not have to be undertaken for movement of the camera and on the other hand the relative position of the camera with respect to the workpiece support does not change when the aligning station is moved into or out of the blocker axis.

For preference, provided for movement and positioning of the workpiece carriage guided at substantially vertically extending guide rods is a stationary rotary drive drivingly connected with a ball screw drive comprising a rotatably mounted ball screw spindle in engagement with a nut connected with the workpiece carriage to be secure against relative rotation. In principle, use of other linear guides such as, for example, rails with carriages, or the like, and other drives such as, for example, a linear motor, a hollow-shaft servomotor in the carriage or the like, would indeed also be conceivable. On the other hand, the construction of guide and drive preferred above is less expensive and has a high degree of stiffness and insensitivity to dirt. Moreover, the preferred arrangement is advantageous in terms of energy, because the drive of the workpiece carriage does not have to be moved or held against gravitational force. Beyond that, it is possible to achieve self-locking through suitable selection of the pitch of the ball screw spindle so that the workpiece carriage can be held, particularly during the blocking, in quasi energy-free manner above the blocking station without a compensatory weight or a brake having to be provided for that purpose.

In a preferred embodiment of the holding head this can be provided with a holding-down device for the workpiece supported on the workpiece support of the aligning station, wherein the holding-down device comprises a pneumatically actuable piston-cylinder arrangement with a piston rod, which is extendable in the direction of the workpiece and aligned with the blocker axis and which at the end carries a pressure member for engagement with the workpiece. Such a construction can be advantageously formed in compact manner, is very stiff and reliably ensures, also by virtue of its central arrangement, temporary frictional fixing of the initially manually aligned workpiece on the workpiece support, wherein the pressing force can be applied, in finely sensitive measure, by means of the pneumatically actuable piston-cylinder arrangement. Moreover, the workpiece can advantageously be supported in the workpiece center by use of the centrally arranged pressure member when it is urged by way of the holding head, which is mounted on the workpiece carriage, into the temporarily deformable blocking material.

In principle, it is conceivable to equip the holding head for the workpiece with a multi-finger gripper for holding the workpiece at the edge thereof, in which case, however, the individual fingers of such a gripper would have to be specially constructed and driven so as to ensure that a workpiece once aligned with respect to the blocker axis does not move out of its aligned position during gripping and holding. On the other hand, however, preference is given to an embodiment—because it can be realized more expeditiously and economically for achieving the aforesaid effect—in which the holding head comprises a suction device for holding the aligned workpiece by use of sub-atmospheric pressure, with an annular sucker lip which surrounds the blocker axis and which can be brought into contact with the workpiece supported on the workpiece support of the aligning station.

In a preferred development of this solution the sucker lip can be tiltable with respect to the blocker axis by way of a spherical bearing arrangement mounted at an end of a sucker shank, which is mounted in the holding head to be longitudinally displaceable along the blocker axis and at the same time fixable in any axial relative setting with respect to the holding head. The sucker lip can thus rest even on inclined surfaces of thicker workpieces without the risk of an axial offset of the workpiece with respect to the blocker axis then occurring.

In a further preferred embodiment the holding head can have a counter-bearing arrangement for supporting the workpiece, which is held at the holding head, in its aligned position, wherein the counter-bearing arrangement has at least three pressure pins which extend parallel to the blocker axis and are arranged in distribution therearound and which are longitudinally displaceable with respect to the holding head so as to each come into contact with the workpiece by an end protruding from the holding head and are fixable in the respective axial relative setting thereof with respect to the holding head. This economic construction reliably achieves a three-dimensional fixing of the position of the aligned workpiece at the time of transport thereof from the aligning station to the blocking station and, at the latter, a three-dimensionally defined support of the workpiece during the pressing process at the temporarily deformable blocking material, in which case even comparatively large pressing pressures can be exerted.

In that regard, in an expeditious and economic as well as very stiff design of the counter-bearing arrangement the pressure pins are mounted in parallel arrangement with a plurality of cylinder pins in an annular space of the holding head, wherein provided for axial fixing of the pressure pins is a drive which pushes a wedge between adjacent cylinder pins in a direction transverse to the blocker axis.

In an embodiment which is particularly advantageous for a party automated blocking process there can be integrated in the blocking device a metering device which applies the blocking material in a deformable state and in defined quantity to the block piece mounted in the block piece mount, wherein the metering device is preferably movable together with the aligning station so that advantageously an individual drive with a guide does not have to be provided for positioning the metering device above the block piece.

In that case, a metering head of the metering device can be movably mounted on the station carriage for the aligning station so that it is movable in the direction of the mounting member mounted in the block piece mount and away therefrom, wherein the blocking material can be fed in a position of the metering head near the block piece and the feed of the blocking material can be terminated under movement of the metering head away from the position near the block piece to a position remote from the block piece. This (additional) arrangement, which is movable relative to the station carriage, of the metering head of the metering device permits controlled detaching of a blocking material drop which—also due to the possibly high viscosity of a liquid blocking material—might not be possible if only the station carriage were to be moved away laterally at the conclusion of the blocking material feed. However, if a blocking material drop is not detached then the blocking station would be contaminated by "drawing" the liquid blocking material laterally over the block piece.

Finally, in a preferred embodiment the block piece mount can, when operation is to be with optically curable adhesives as blocking material, be constructed to be at least partly transparent, in which case arranged below the block piece mount on the blocker axis is an optical exposure device which optically exposes the blocking material for hardening. In this case, the exposure device can be an ultraviolet lamp. However, in correspondence with the respective exposure requirements it is also possible to use here a variably controllable LED array as lighting source, such as shown and described in the earlier European Patent Application EP 14 189 085.5 of the same applicant. The exposure device can obviously be eliminated in the case of the alternatively possible use of thermoplastic blocking materials. Operation would then be with a heatable feed of the thermoplastic blocking material and a suitable cooling device in or at the blocking station so as to enable rapid solidification of the blocking material.

BRIEF DESCRIPTION OF THE DRAWINGS

The invention is explained in more detail in the following by way of a preferred embodiment with reference to the accompanying partly schematic drawings, which are not true to scale and in which the same reference numerals denote the same or corresponding parts. In the drawings.

DETAILED DESCRIPTION OF THE EMBODIMENT

Figure 1:
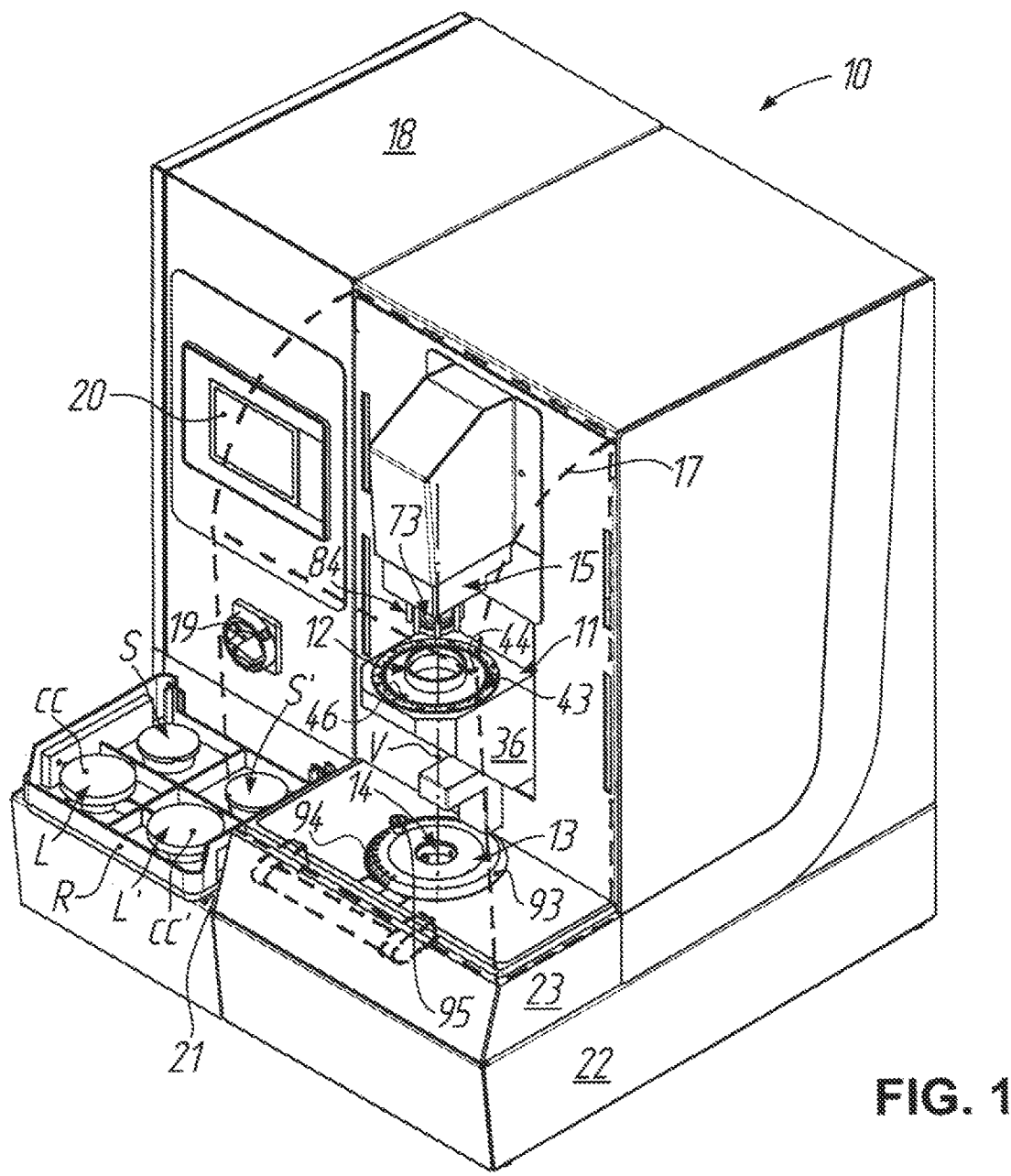
FIG. 1 shows a perspective view of a device according to the invention for blocking spectacle lenses—called blocking device for short in the following—obliquely from above and front right, wherein a hood pivotable into place is illustrated merely in dashed lines so as to afford a free view of subassemblies (blocking station at the bottom, aligning station in the middle, workpiece holding head at the top) which are concealed therebehind and accessible to the user when the hood is pivoted up and which then lie on a common vertical blocker axis.

In FIGS. 1 to 3 and 6 to 13 the reference numeral 10 denotes a blocking device for spectacle lenses L. As described in more detail in the following, the blocking device 10 generally comprises (a) an aligning station 11 with a workpiece support 12 for aligning a spectacle lens L supported on the workpiece support 12, (b) a blocking station 13 with a block piece mount 14 in which the aligned spectacle lens L can be blocked by use a temporarily deformable blocking material M (cf. FIGS. 8 to 13) on a block piece S which is mounted in the block piece mount 14 to be centered with respect to a substantially vertically extending blocker axis V (cf. FIGS. 1, 2 and 6 to 13), and (c) a suitably guided and driven workpiece carriage 16 (cf. FIGS. 2, 3 and 6 to 13). The carriage 16 carries a holding head 15 for the spectacle lens L, transports the aligned spectacle lens L held at the holding head 15 from the aligning station 11 to the blocking station 13, positions it in a defined manner along the blocker axis V relative to the block piece S disposed in the block piece mount 14 and, during the blocking, holds the spectacle lens L in the defined relative position with respect to the block piece S while leaving a blocking material receiving gap G (cf. FIG. 11) between the spectacle lens L and block piece S. As a further feature, the aligning station 11 can be moved from a rest position (FIGS. 10 to 12), in which it does not obstruct movements of the workpiece carriage 16, in particular along the blocker axis V, to a work position (FIGS. 1 to 3, 6 to 9 and 13), in which the workpiece support 12 is centered with respect to the blocker axis V, and conversely, as still to be explained in detail.

According to FIG. 1, seated near the afore-mentioned mechanical components of the blocking device 10, which in their work position can be covered by a hood 17 which is indicated here only by dashed lines and which can be pivoted up manually, is an electrical and pneumatic service cabinet 18 with a PC for electrical and pneumatic control of the blocking device 10 and for providing work media and operating materials. The electrical and pneumatic service cabinet 18 is provided at its front side with a main switch 19 and a touchscreen 20 for control and for optionally computer-assisted aligning. Provided in front of that is a deposit surface 21 on which a prescription box R commonly used in spectacle lens production can be deposited. The box shown here is equipped with two spectacle lenses L, L' of a spectacle lens pair and two block pieces S, S' on which the spectacle lenses L, L' are to be blocked.

Figure 2:
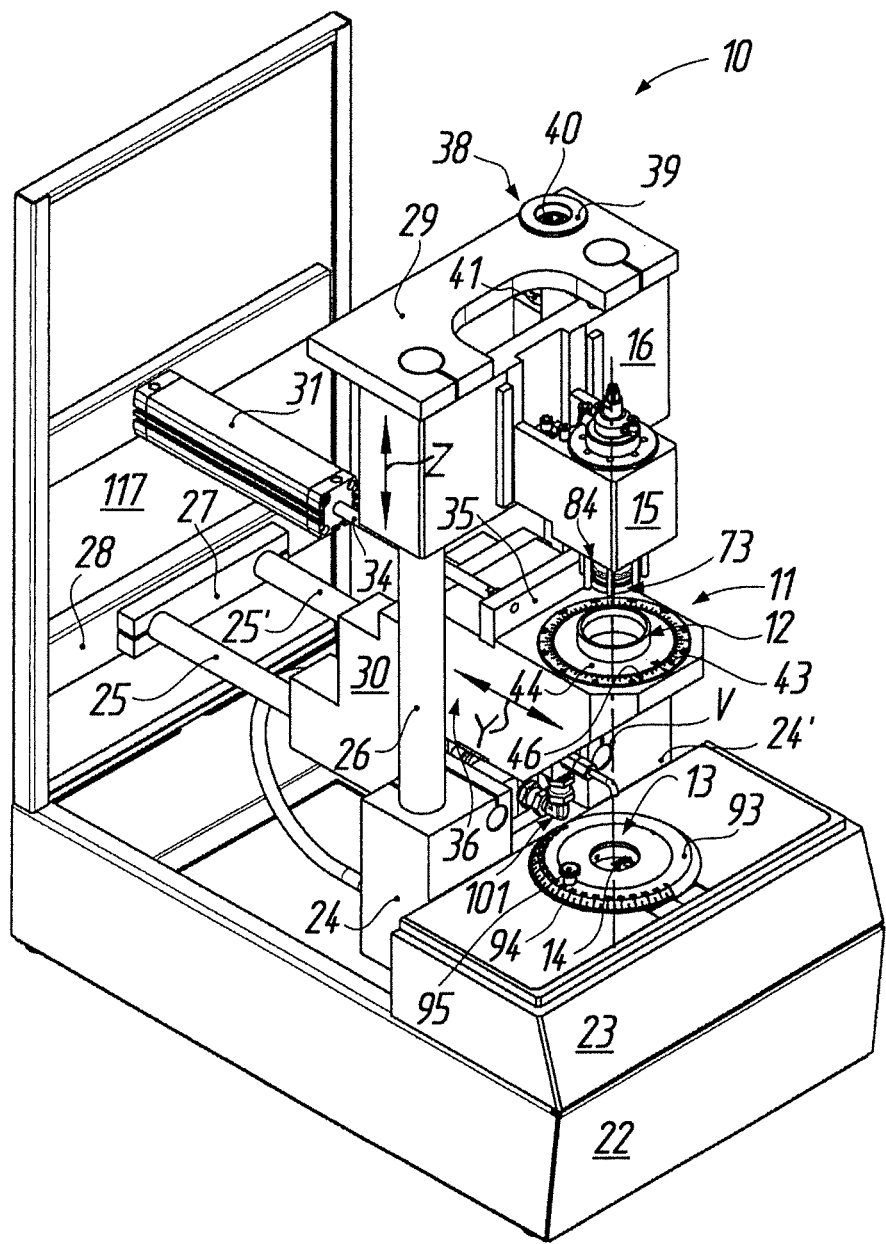
FIG. 2 shows a perspective view of the blocking device according to FIG. 1 obliquely from above and front left, in which for freeing the view of significant components or subassemblies of the blocking device and for simplification of the illustration by comparison with FIG. 1, in particular, the electrical and pneumatic service cabinet therein on the left, all other cladding parts inclusive of hood apart from a rear wall, the supply and feed equipment (inclusive of lines, hoses and pipes) for current, compressed air and blocking material, as well as measuring, maintenance and safety devices, have been omitted.
Figure 3:
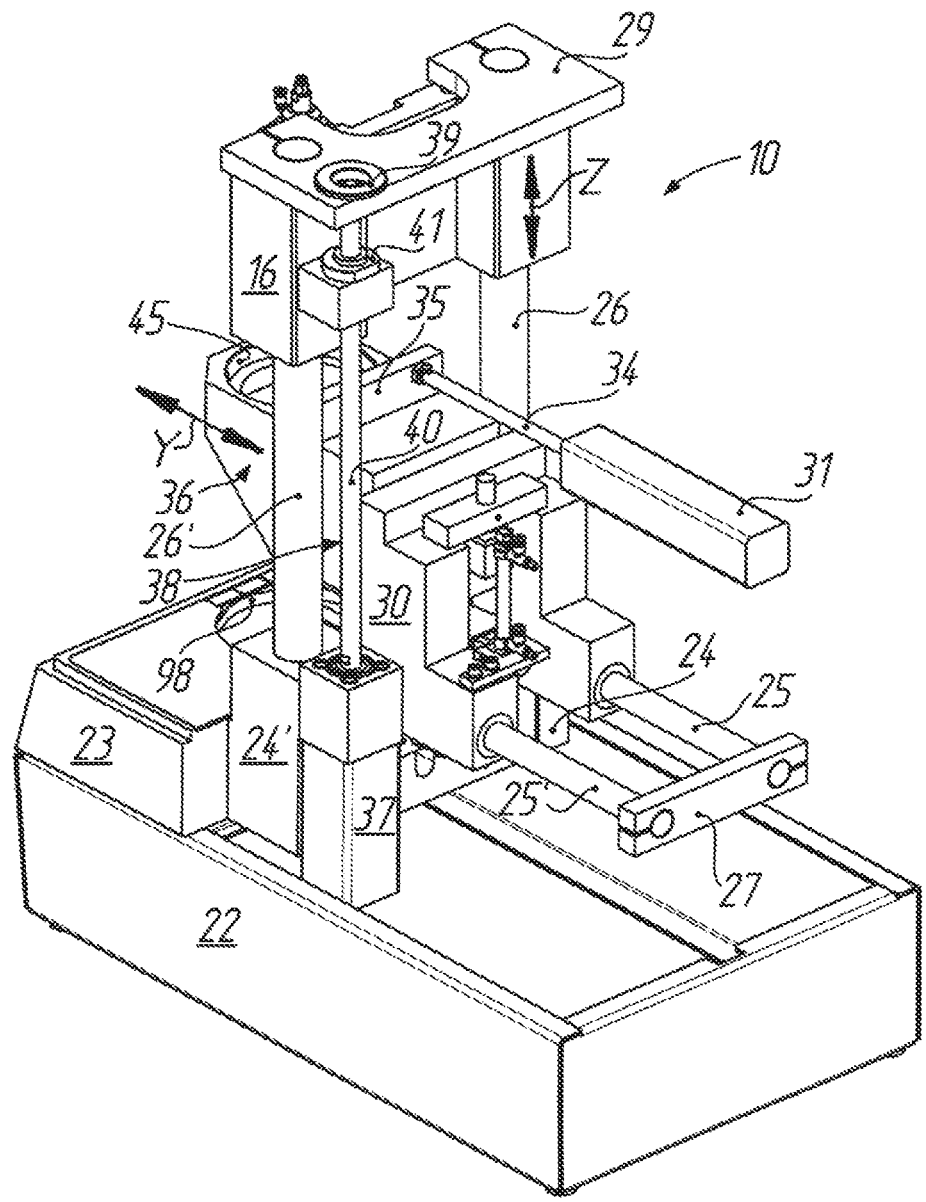
FIG. 3 shows a perspective view of the blocking device according to FIG. 1 obliquely from above and back left with the simplifications of FIG. 2, wherein in addition the rear wall as well as part of the blocking and aligning stations have been omitted.

As far as the mechanical construction of the blocking device 10 is concerned it can be best seen in FIGS. 2 and 3 that a base 23 having at its rear side two bearing blocks 24, 24' is mounted on a base frame 22. Attached to the bearing blocks 24, 24' are two parallel guide rods 25, 25' of a horizontal rod guide, which extend substantially horizontally rearwardly away from the bearing blocks 24, 24', and two parallel guide rods 26, 26' of a vertical rod guide, which extend substantially vertically upwardly away from the bearing blocks 24, 24'. The guide rods 25, 25' of the horizontal rod guide are connected together by way of a plate 27 at their ends remote from the bearing blocks 24, 24', the plate in turn being secured by way of a U profile member 28 to a rear wall 117 standing on the base frame 22. The guide rods 26, 26' of the vertical rod guide are also connected together by a plate 29 at their upper ends remote from the bearing blocks 24, 24'.

A station carriage 30 on which the aligning station 11 is mounted is axially guided at the substantially horizontally extending guide rods 25, 25' by way of axial bearing elements, which are not shown in the figures. The station carriage 30 is movable by means of a pneumatic cylinder 31 (cf. FIGS. 2 and 3) along a substantially horizontal travel axis Y transversely to the blocker axis V onto end abutments which define the rest and work positions of the aligning station 11. In that case, the end abutment in the rest position (FIGS. 10 to 12) is constructed at or in the pneumatic cylinder 31 in a manner known per se, but not shown here. By contrast the end abutment in the work position (FIGS. 1 to 3, 6 to 9 and 13) is formed by an abutment surface 32 at the base 23, with which a settable shock absorber 33 secured to the station carriage 30 co-operates as can be best seen in the illustration, which is broken away at this location, according to FIG. 7. A piston rod 34 of the pneumatic cylinder 31 engages a station housing 36, which is secured to the station carriage 30, by way of an entrainer 35 for transmission of movement from the pneumatic cylinder 31 to the station carriage 30.

On the other hand, the workpiece carriage 16 carrying the holding head 15 is axially guided at the substantially vertically extending guide rods 26, 26' by way of axial bearing elements, which are not illustrated in the figures. A rotary drive 37 (cf., in particular, FIGS. 3 and 10 to 12) such as, for example, a step motor, which is mounted in stationary position on the bearing block 24' and which is drivingly connected with a ball screw drive 38, is provided for moving and positioning the thus-guided workpiece carriage 16 along a linear axis Z. The ball screw drive 8 comprises a ball screw spindle 40, which is rotatably mounted on the rotary drive 37 and on the plate 29 at 39 and which is in engagement with a nut 41 connected with the workpiece carriage 16 to be secure against relative rotation. The thus-formed linear axis Z is CNC positionally closed loop controlled; however, for simplification of the illustration the associated travel measuring system is not shown.

Further details with respect to the construction and functioning of the aligning station 11 can be inferred from, in particular, FIGS. 6 to 19. Accordingly, the aligning station 11 comprises—as seen in upward direction from below in FIGS. 6 to 13—a protective pane 42, a scale ring 43 and a prism ring 44 insertable therein from above, which are all seated in centered manner in a circularly round, stepped opening 45 of the station housing 36, which for its part is aligned with the blocker axis V when the aligning station 11 is disposed in its work position.

Figure 15:
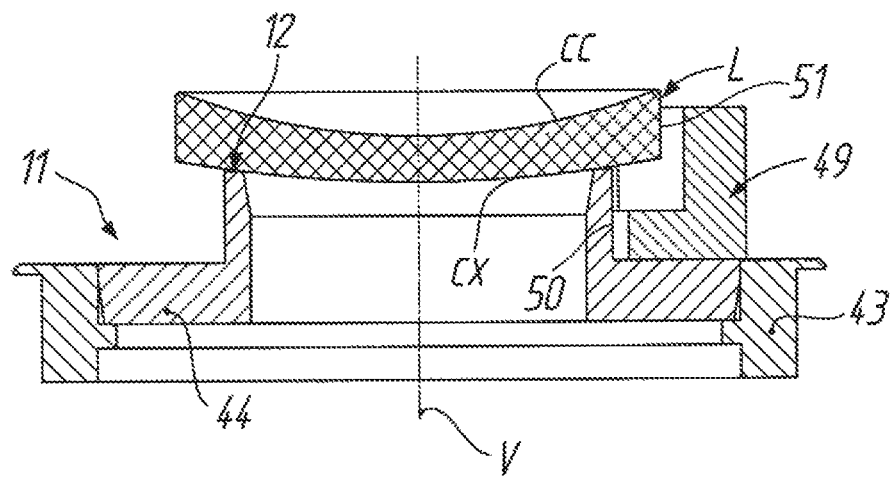
FIG. 15 shows a side view of the aligning station of the blocking device according to FIG. 1 in correspondence with the section line XV-XV in FIG. 14.
Figure 17:
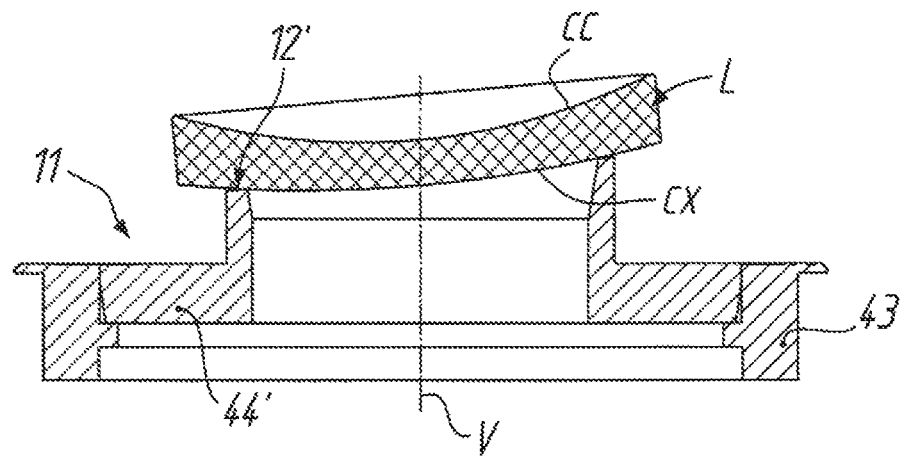
FIG. 17 shows a sectional view of the aligning station of the blocking device according to FIG. 1 in correspondence with the section line XVII-XVII in FIG. 16.

In that case the annular workpiece support 12 is formed by the prism ring 44, which is exchangeably mounted on the aligning station 11 so that differently chamfered prism rings 44 can be inserted into the scale ring 43 in correspondence with the respective blocking requirements. This is shown by way of example in FIGS. 15 and 17; whereas the workpiece support 12 at the prism ring 44 of FIG. 15 is not chamfered with respect to the blocker axis V (prism angle of 0°, the workpiece support 12' at the prism ring 44' according to FIG. 17 is chamfered or inclined with respect to the blocker axis V (here by a prism angle of 5°). A plurality of differently chamfered prism rings 44, 44', which are, for example, stepped by degrees (0°, 1°, 2°, 3°, etc.), can be stocked here so as to cover the desired range of prism angles for blocking.

Whereas the scale ring 43 is fixedly mounted at the aligning station 11, the respectively inserted prism ring 44, 44' in the scale ring 43 can be rotated about the blocker axis V. In that case, a marking 46 or 46' at the corresponding prism ring 44, 44' in co-operation with the scale ring 43 enables a defined rotational angle orientation of the prism ring 44, 44' about the blocker axis V.

As is additionally shown in FIGS. 6 to 13, a camera 47 is mounted on the station carriage 30. The spectacle lens L supported on the workpiece support 12 of the aligning station 11 can be filmed along the blocker axis V by the camera 47 by use of a deflecting mirror 48, which is similarly mounted on the station carriage 30 by way of the station housing 36 and which is mounted in the station housing 36 in the manner of a mirror box, when the aligning station 11 is disposed in its work position.

Figure 14:
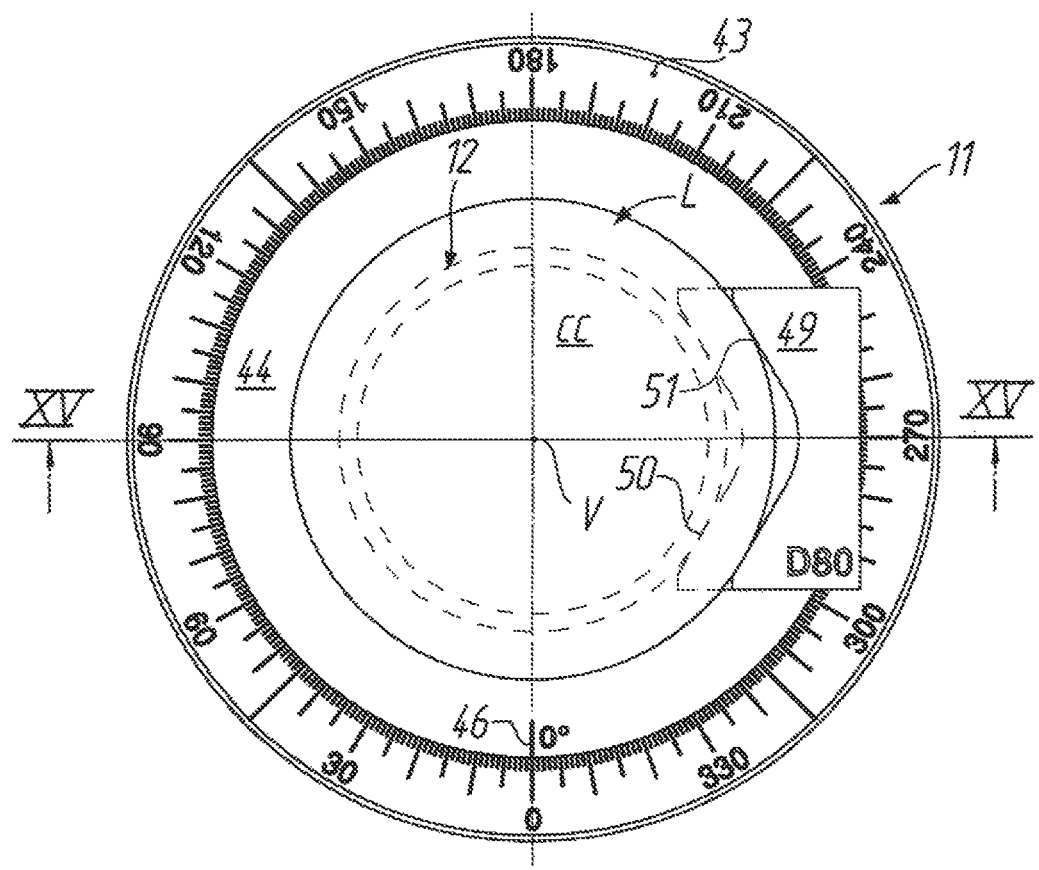
FIG. 14 shows a plan view of the aligning station of the blocking device according to FIG. 1 for illustration of an aligning process for a single-strength spectacle lens, which is to be non-prismatically blocked.

With this construction, the spectacle lens L to be blocked can be aligned in the aligning station 11 in defined manner on the workpiece support 12, as is illustrated in FIGS. 14 to 19. FIGS. 14 and 15 in that regard show the simplest case of a single-strength spectacle lens L to be blocked without a prism. In this case, alignment is possible by use of a centering aid 49 which is matched to the diameter of the spectacle lens L (here, for example, 80 mm) and to the diameter of the prism ring 44 in the region of the workpiece support 12. In that case, the centering aid 49 can be placed by a step 50, which is lower in FIG. 15, on the projecting circumference of the prism ring 44, which at this location has a defined diameter, after which the spectacle lens L, which is circularly round as seen in plan view, is placed by its edge on a step 51, which is upper in FIG. 15, of the centering aid 49 and which is at a defined radial spacing from the lower step 50. It is apparent that centering of the spectacle lens L with respect to the blocker axis V is thus possible in an extremely simple manner.

Figure 16:
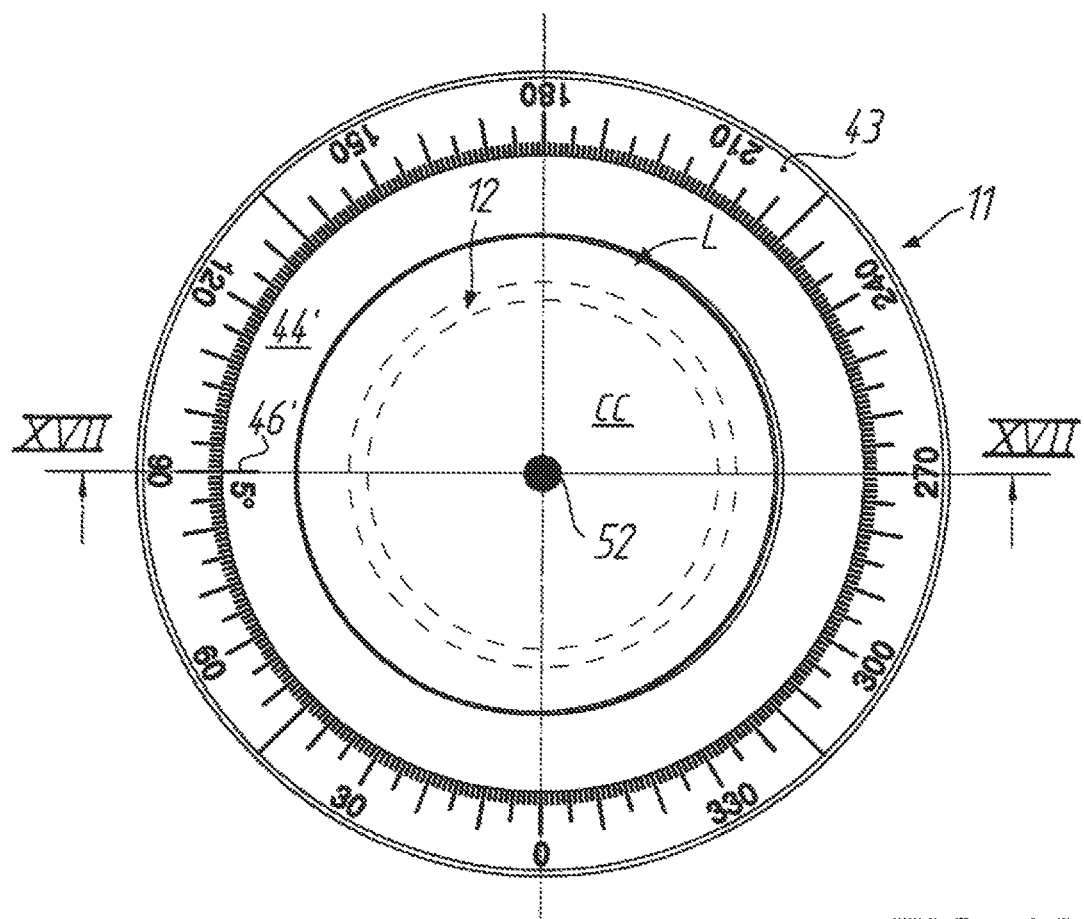
FIG. 16 shows a plan view of the aligning station of the blocking device according to FIG. 1 for illustration of an aligning process with a single-strength spectacle lens which is to be prismatically blocked.

FIGS. 16 and 17 show the case of a single-strength spectacle lens L which is to be blocked with a prism angle of 5°. For that purpose, the spectacle lens L was marked with a point 52 corresponding with the geometric center of the spectacle lens L. In this aligning process, the spectacle lens L supported on the workpiece support 12' of the prism ring 44' oriented in rotational angle in defined manner at the scale ring 43 can be filmed by the camera 47 by way of the deflecting mirror 48 from below through the prism ring 44', which can be displayed on the touchscreen 20 of the blocking device 10, on which there is to be seen at the same time a computer-generated crosshair having an intersection point corresponding with the blocker axis V. The user now merely has to align the filmed point 52 of the spectacle lens L with the crosshair by manually displacing the spectacle lens L on the workpiece support 12.

Figure 18:
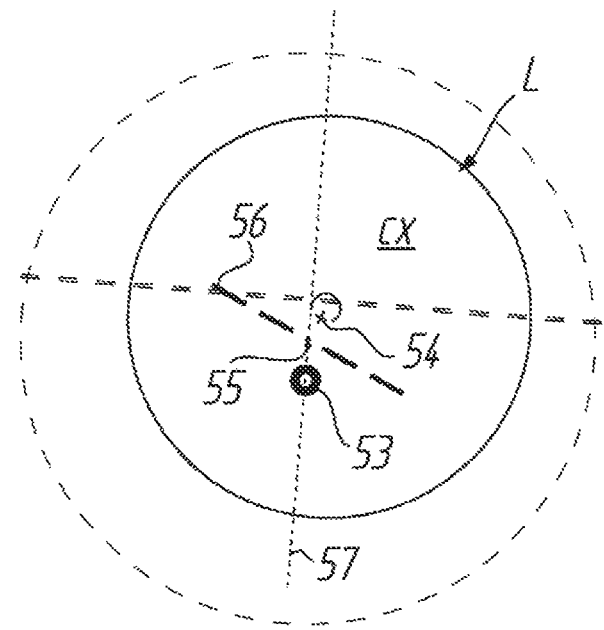
FIG. 18 shows a diagram with respect to an aligning process for a progressive spectacle lens, which is to be blocked, with use of computer-generated alignment aids and a camera image on a computer display screen, wherein the progressive spectacle lens is not yet aligned.
Figure 19:
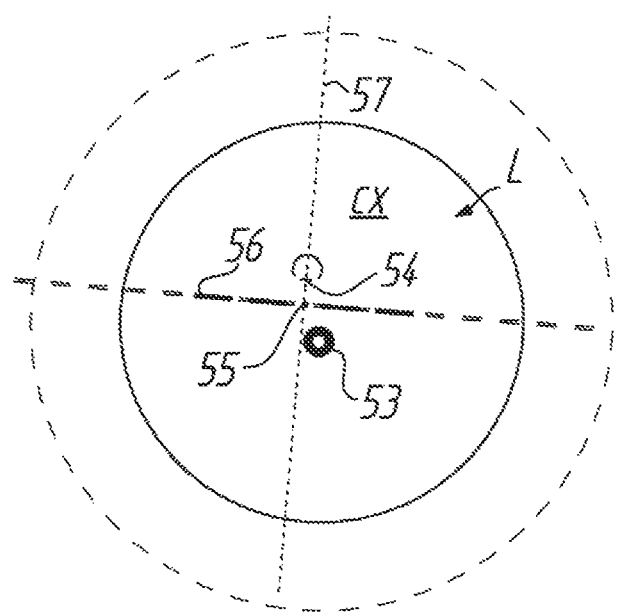
FIG. 19 shows a diagram, which corresponds with FIG. 18, with respect to the aligning process for the progressive spectacle lens to be blocked, this time with correctly aligned progressive spectacle lens.

FIGS. 18 and 19 illustrate the case of a progressive spectacle lens L, which prior to blocking and processing is usually provided with the illustrated stamp markings representing the near point 53, far point 54, prism reference point 55 and lens horizontal 56. With these markings, the spectacle lens L filmed from below can be manually aligned, analogously to the embodiments of FIGS. 16 and 17, with the crosshair 57, which is computer-generated in correspondence with the actual position of the prism ring 44, so as to change from an unaligned position (FIG. 18) to an aligned position (FIG. 19).

Figure 4:
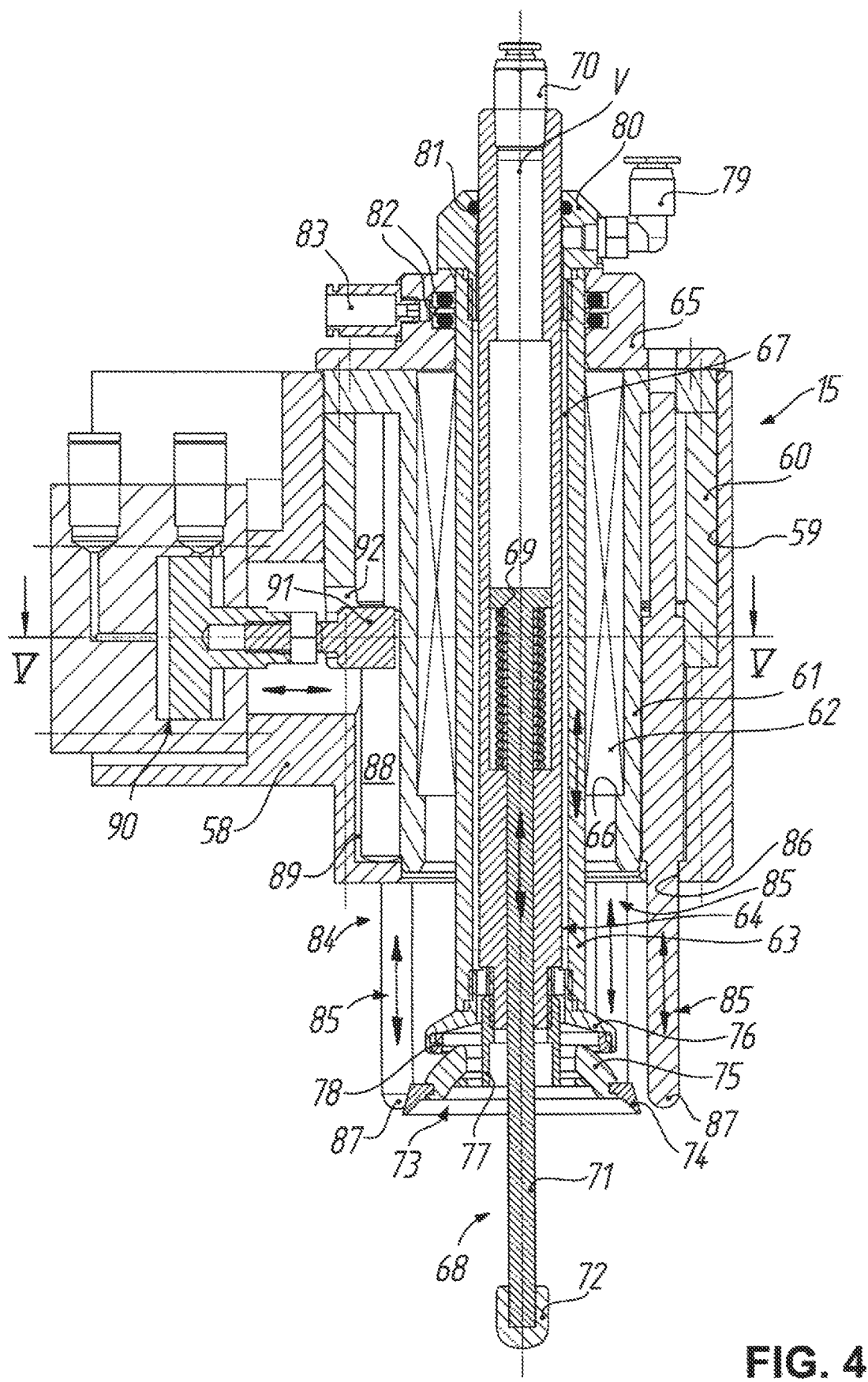
FIG. 4 shows a longitudinal sectional view of the holding head of the blocking device according to FIG. 1, wherein the sectional plane runs through the vertical blocker axis.
Figure 5:
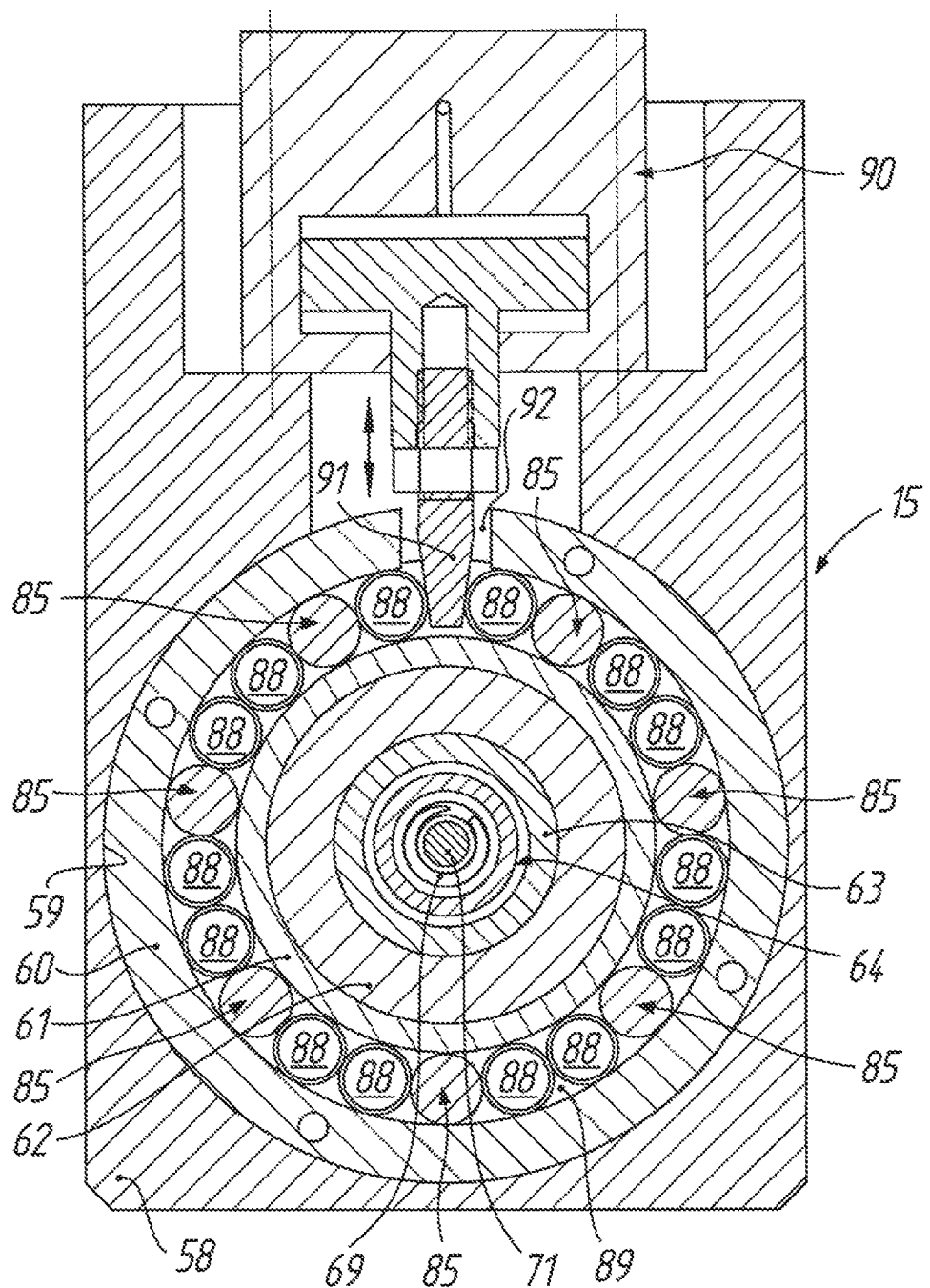
FIG. 5 shows a sectional view, which is turned in the drawing plane through 90° in clockwise sense, of the holding head of the blocking device according to FIG. 1 in correspondence with the section line V-V in FIG. 4.

Reference may now be made to FIGS. 4 and 5 for explanation of further details of the holding head 15. The holding head 15 comprises, firstly, a housing 58, which is flange-mounted at a defined position of the workpiece carriage 16, with a stepped passage bore 59 aligned with the blocker axis V in the flange-mounted state of the housing 58. A cylinder sleeve 60, a bearing sleeve 61, a ball bush 62, a sucker shank 63 and, at a central point, a piston-cylinder arrangement 64 are received in the passage bore 59 of the housing 58 in an arrangement—which is centered with respect to the blocker axis V—as seen from radially outwardly towards the blocker axis V. As indicated in FIG. 4 by dot-dashed lines, the cylinder sleeve 60 is fixedly screw-connected with the housing 58. By contrast, the bearing sleeve 61 is fixedly screw-connected with the cylinder sleeve 60 by way of an integrally formed flange. A clamping flange 65 screw-mounted on the bearing sleeve 61 holds the ball bush 62 in axial direction on a radially inner step 66 of the bearing sleeve 61. The sucker shank 63 is received in the ball bush 62 to be longitudinally displaceable, whilst ultimately the piston-cylinder arrangement 64 is secured in the sucker shank 63 to leave an annular gap 67 between sucker shank 63 and piston-cylinder arrangement 64.

The piston-cylinder arrangement 64 is in that case a component of a holding-down device 68, which is integrated in the holding head 15, for the spectacle lens L supported on the workpiece support 12 of the aligning station 11. In that case, the piston-cylinder arrangement 64 can be pneumatically loaded against the force of a compression spring 69 by way of a pressure connection 70 so as to move out a piston rod 71 in the direction of the spectacle lens L. The piston rod 71 is aligned with the blocker axis V and at the end carries a pressure member 72 of a resilient material for engagement with the spectacle lens L.

On the other hand, the sucker shank 63 is a component of a suction device 73, which is similarly integrated in the holding head 15, for holding the aligned spectacle lens L by means of sub-atmospheric pressure. The suction device 73 has an annular resilient sucker lip 74 which surrounds the blocker axis V and which can be brought into contact with the spectacle lens L supported on the workpiece support 12 of the aligning station 11. In that regard, the sucker lip 74, which is secured to a spherical cap 75, is tiltable with respect to the blocker axis V in a spherical cap receptacle 76 mounted on the sucker shank 63, wherein the spherical cap 75 is held by means of a spherical cap holder 77 on the end, which is lower in FIG. 4, of the piston-cylinder arrangement 64. A sealing ring 78 ("step-seal ring") received between the spherical cap 75 and the spherical cap receptacle 76 provides a reliable seal here even in the case of relative tilting. A sub-atmospheric pressure can be applied to the suction device 73 by way of a further pressure connection 79 at an upper flange part 80 and the mentioned annular gap 67, wherein an O-ring 81 inserted between an upper end of the piston-cylinder arrangement 64 and the flange part 80 seals relative to the environment.

Although in the illustrated embodiment the axial bearing for the sucker shank 63 is formed by the ball bush 62 between the bearing sleeve 61 and the sucker shank 63 the ball bush 62 can also be eliminated if the materials of bearing sleeve 61 and sucker shank 63 are suitably matched to one another in such a way that the sucker shank 63 can be directly slidably journalled in the bearing sleeve 61. A significant advantage of such an arrangement would reside particularly in its small need for radial installation space.

As already indicated, the sucker shank 63 is mounted by the ball bush 62 in the holding head 15 to be longitudinally displaceable along the blocker axis V; at the same time, the sucker shank 63 is fixable relative to the holding head 15 in any axial radial setting. For that purpose, inserted in the annular grooves in the clamping flange 65 are O-rings 82 which can be pressed against the outer circumferential surface of the sucker shank 63 when pressure loading by way of a pressure connection 83 takes place. Alternatives are also conceivable for axial fixing of the sucker shank 63 in the holding head 15: thus, instead of the two O-rings 82 an annular membrane part which is, for example, 3D-printed can be received in an annular groove—which is at the inner circumference—of the clamping flange 65, the membrane part being inflatable in the manner of a tire tube so as to clamp the sucker shank 63 at the outer circumferential surface thereof.

Moreover, the holding head 15 has, as a third functional unit, a counter-bearing arrangement 84 for supporting the spectacle lens L, which is held at the holding head 15, in its aligned position. The counter-bearing arrangement 84 has at least three, in the illustrated example seven, pressure pins 85 (see, again, FIGS. 4 and 5), which extend parallel to the blocker axis V and are arranged to be distributed therearound and which are longitudinally displaceable with respect to the holding head 15 so as to each come into contact with the spectacle lens L by an end 87 protruding from the holding head 15 through an associated bore 86 in the housing 58. In addition, the pressure pins 85 are fixable in their respective axial relative setting with respect to the holding head 15. For that purpose, the pressure pins 85 are mounted in parallel arrangement with a plurality of cylinder pins 88 in an annular space 89, which is formed between the cylinder sleeve 60 and the bearing sleeve 61, of the holding head 15, wherein provided for axial fixing of the pressure pins 85 is a drive 90—in the illustrated embodiment a pneumatically actuable double-acting piston-cylinder arrangement flange-mounted on the housing 58—which can drive or push a wedge 91 between adjacent cylinder pins 88 through a cut-out 92 in the cylinder sleeve 60 in a direction transverse to the blocker axis V, which as a result leads to a frictional clamping of the pressure pins 85.

Further details of the blocking station 13 can be inferred from FIGS. 1, 2 and 6 to 13. Accordingly, the block piece mount 14 is constructed for mechanically positive mounting of the block piece S—which in known manner can be carried out in correspondence with the construction of the holding section of the respectively employed block piece S which, in a given case, can even have a standard connection—and can be rotated in defined manner in the blocking station 13 about the blocker axis V by use of a setting ring 93 with a scale 94, for which purpose the setting ring 93 is provided with a handle 95. According to, in particular, FIG. 6 the setting ring 93 itself is rotatably received in a slide ring 96 and retained at this by a retaining ring 97, wherein the slide ring 96 being secured in an associated opening 98 in the base 23. The actual mount for the block piece S is formed by a transparent mounting member 99 fastened in the setting ring 93. The slide ring 96, the setting ring 93 and the mounting member 99 are centered with respect to the blocker axis V.

Since the block piece mount 14 in the illustrated embodiment is constructed to be completely transparent, the blocking material M on the block piece S can, for hardening, be suitably optically exposed by an equally transparent block piece S such as used in, for example, the "nucleo" process of the Satisloh Group by use of an optical exposure device 100 arranged below the block piece mount 14 on the blocker axis V.

Figure 6:
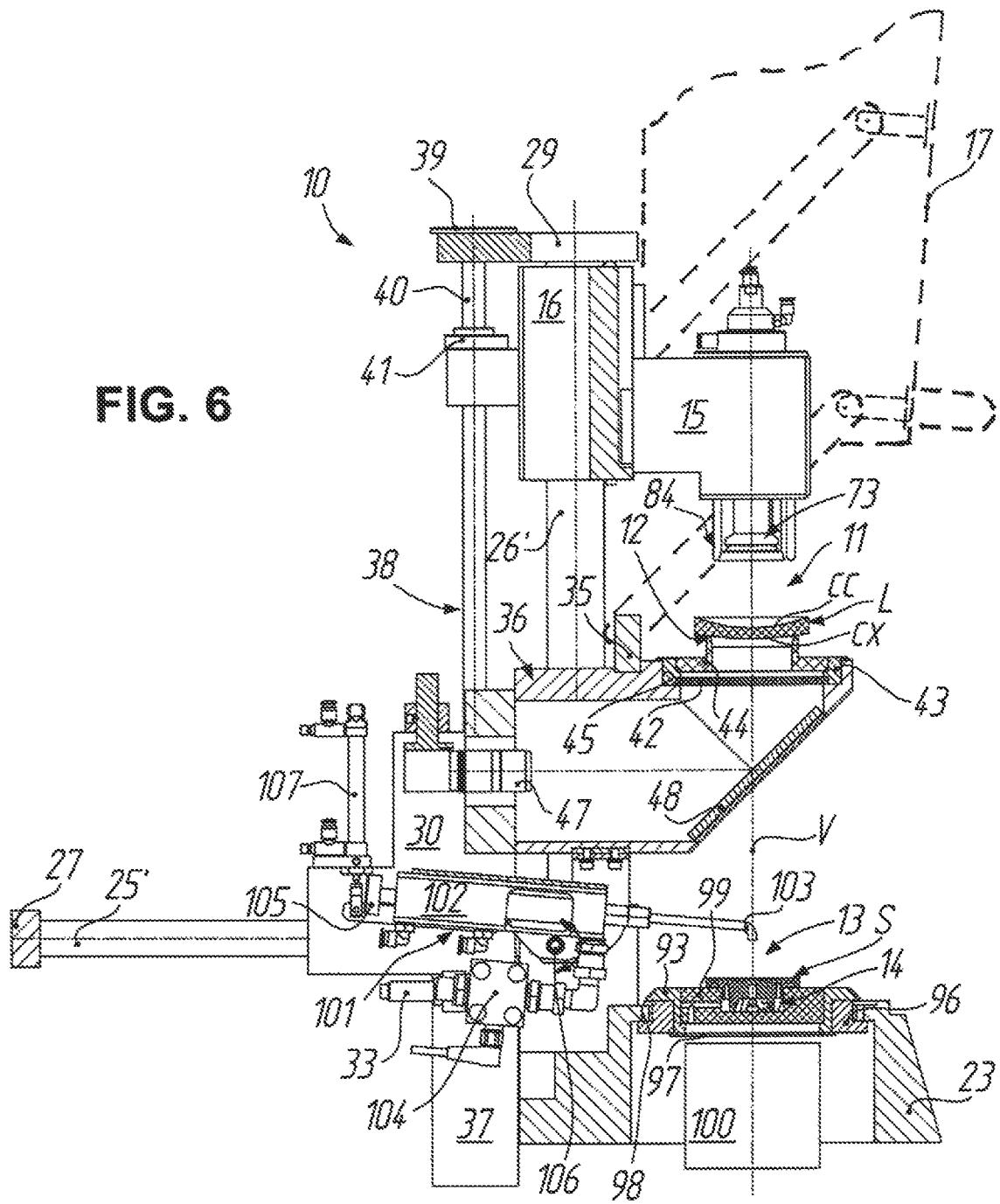
FIGS. 6 to 13 show longitudinal sectional views of the blocking device according to FIG. 1 with the simplifications of FIG. 2, wherein in addition the rear wall as well as a base frame of the blocking device have been omitted and the holding head is illustrated in non-sectioned state, for illustration of a possible partly automated blocking process in the time sequence thereof.
Figure 7:
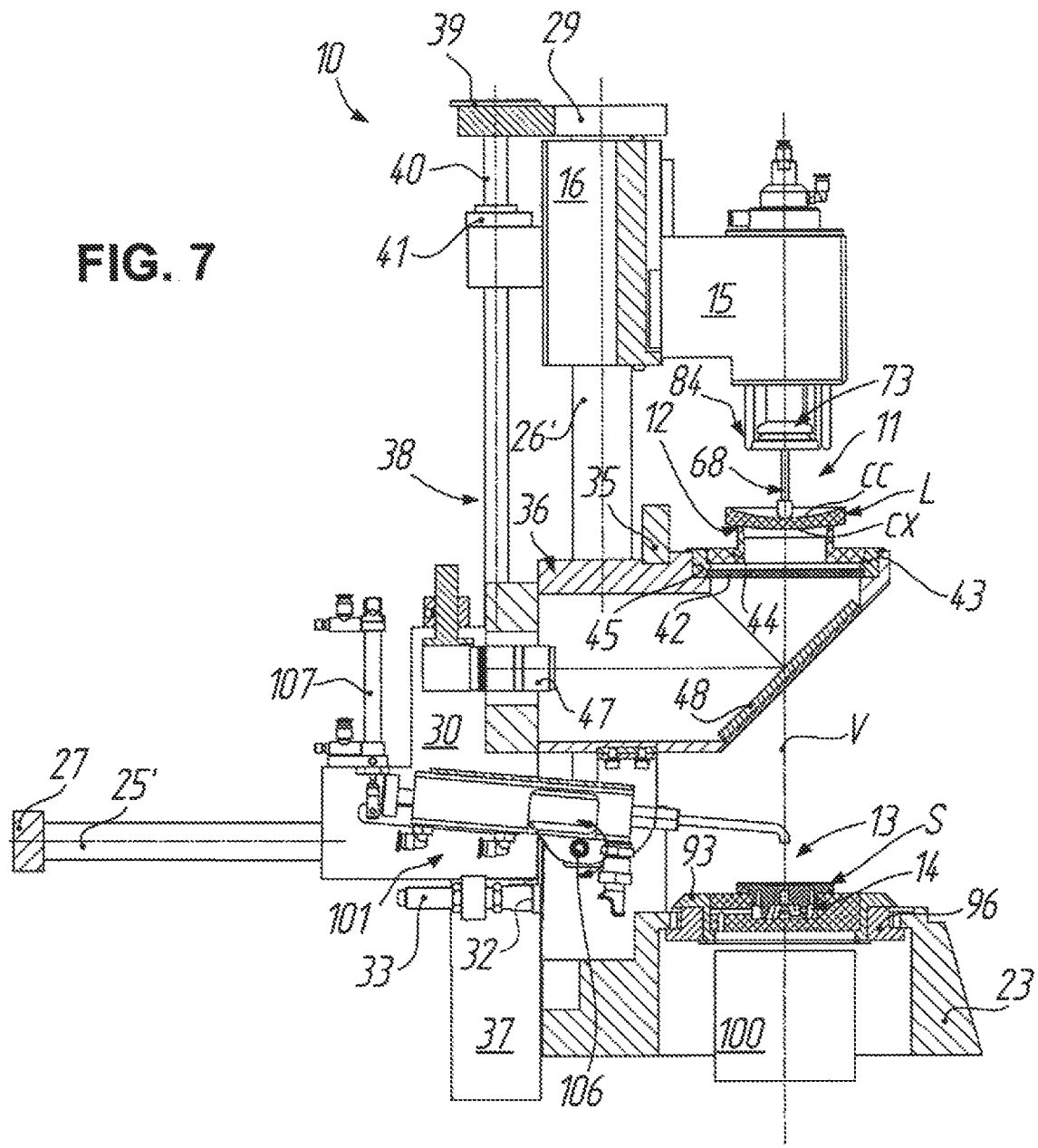

A metering device 101 is similarly illustrated in, in particular, FIG. 6, which can apply the blocking material M in defined quantity in a deformable, i.e. here highly viscous, state to the block piece S mounted in the block piece mount 14, the metering device 101 being mechanically connected with the station carriage 30 so that it is movable together with the aligning station 11. In that regard, the metering device 101 comprises, as known for ultraviolet adhesives, a metering valve 102 with an angle nozzle 103 forming the actual metering head as well as a quantity meter 104 in order to determine the delivered amount of blocking material. The delivery speed of the blocking material M can in that case be set at the metering valve 102 by way of a knurled screw 105. The pump, which is connected with the metering device 101, for the feed of the blocking material M is not shown in the figures. As can be seen in FIG. 6, the angle nozzle 103 in the work position of the aligning station 11, in which the station carriage 30 is disposed in its front setting, is aligned with respect to the blocker axis V for centered delivery of the blocking material M.

A feature resides in the fact that the metering head (102, 103) of the metering device 101 is movably mounted at 106 on the station carriage 30 for the aligning station 11. It is movable in the direction of the block piece S, which is mounted in the block piece mount 14, and away therefrom. The blocking material M is fed in a position of the metering head near the block piece S and the feed of the blocking material M can be terminated under movement of the metering head away from the position near the block piece S to a position remote from the block piece S, which enables defined detaching of the adhesive drop. In order to generate tilting movement of the metering head about the tilt bearing 106, a small pneumatic cylinder 107 mounted on the station carriage 30 is provided.

Figure 8:
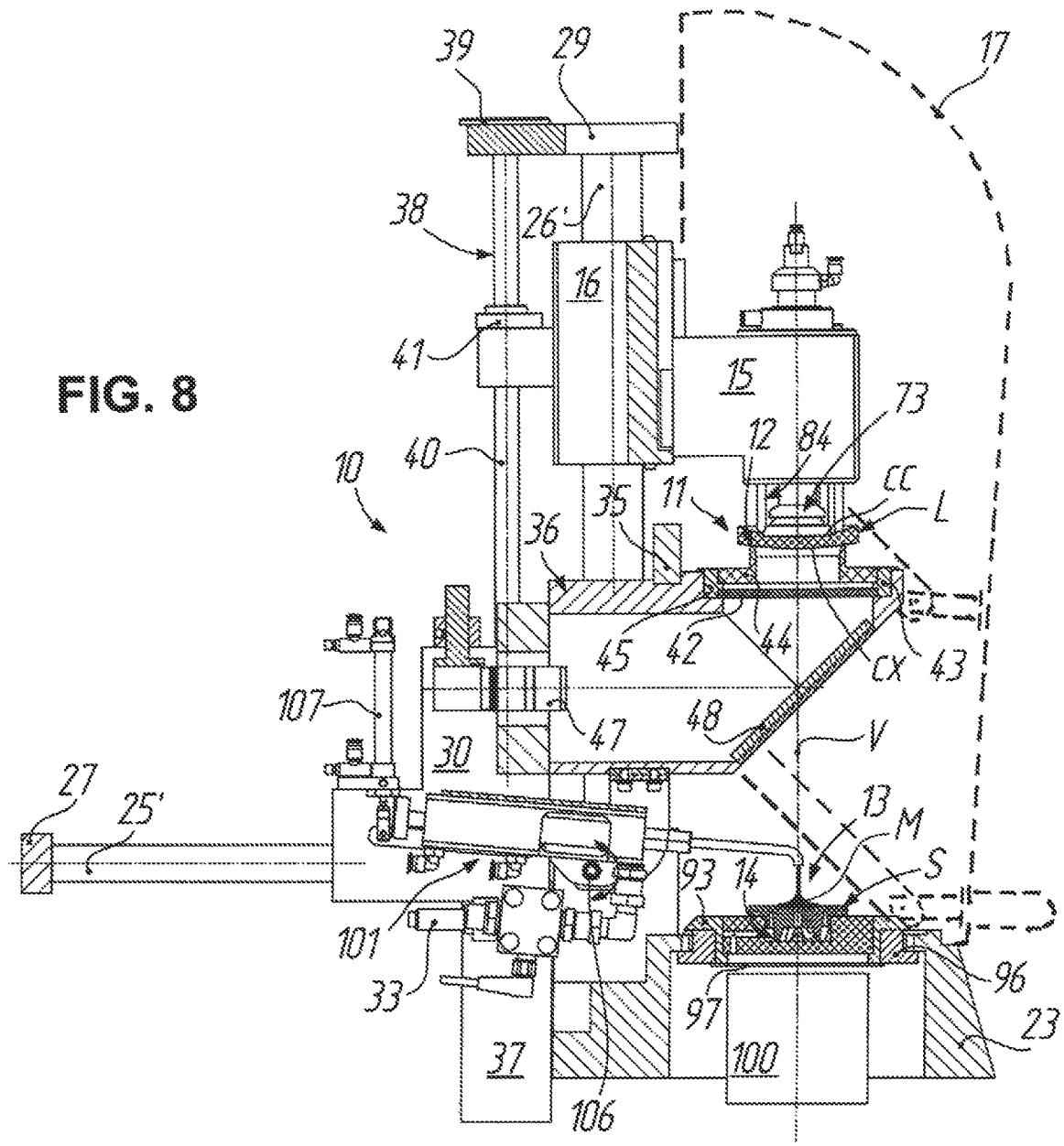
Figure 9:
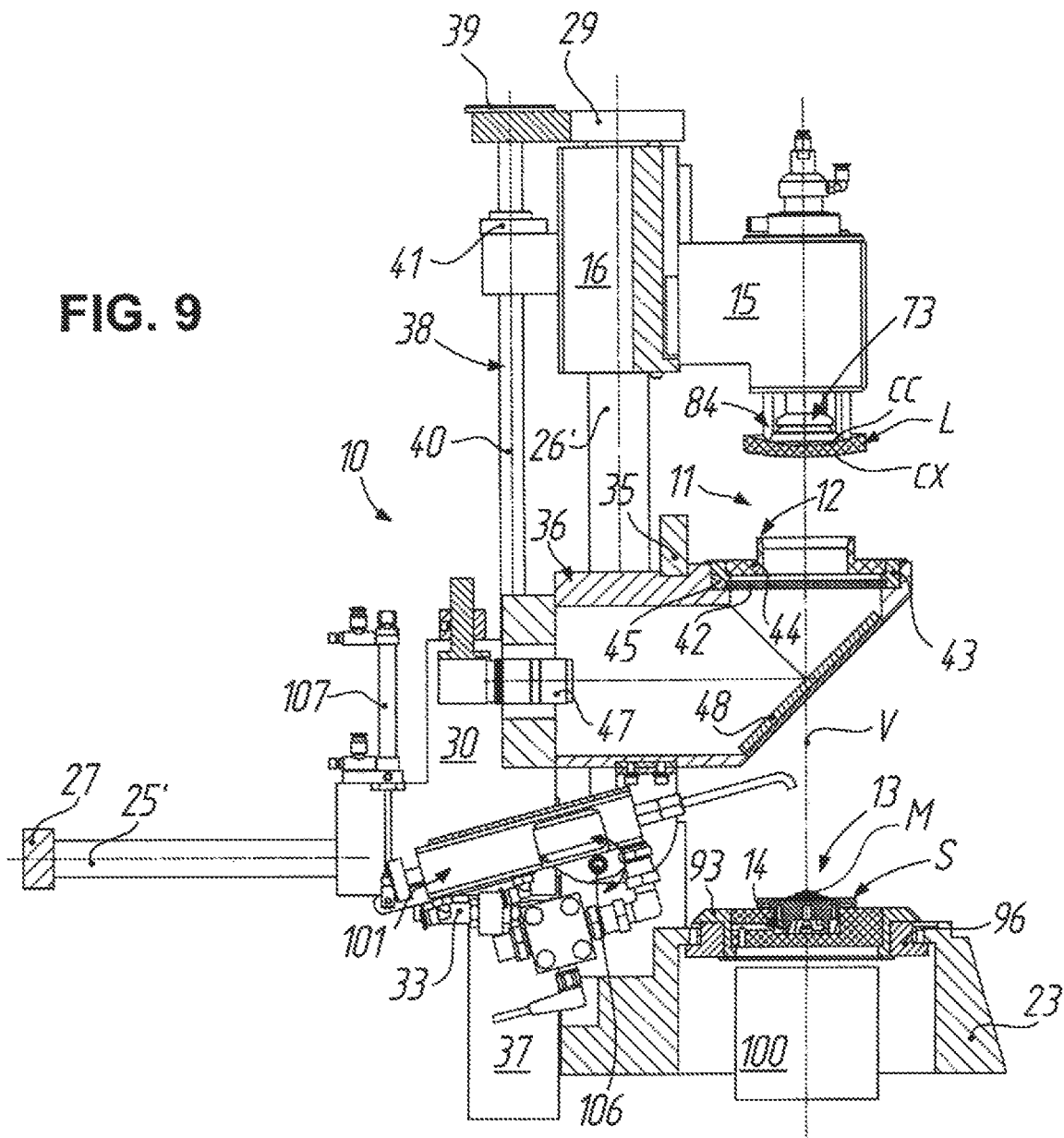
Figure 10:
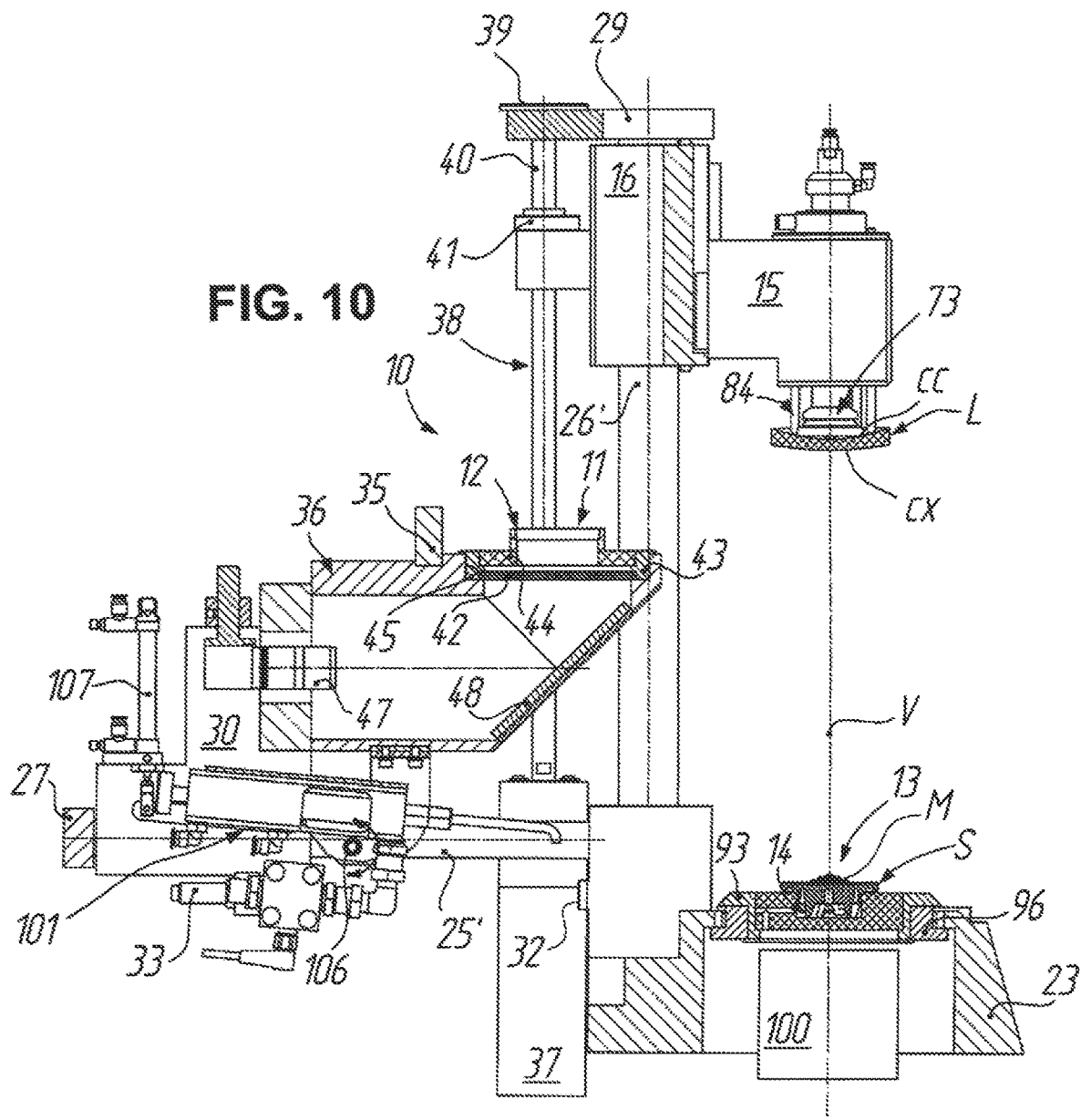
Figure 11:
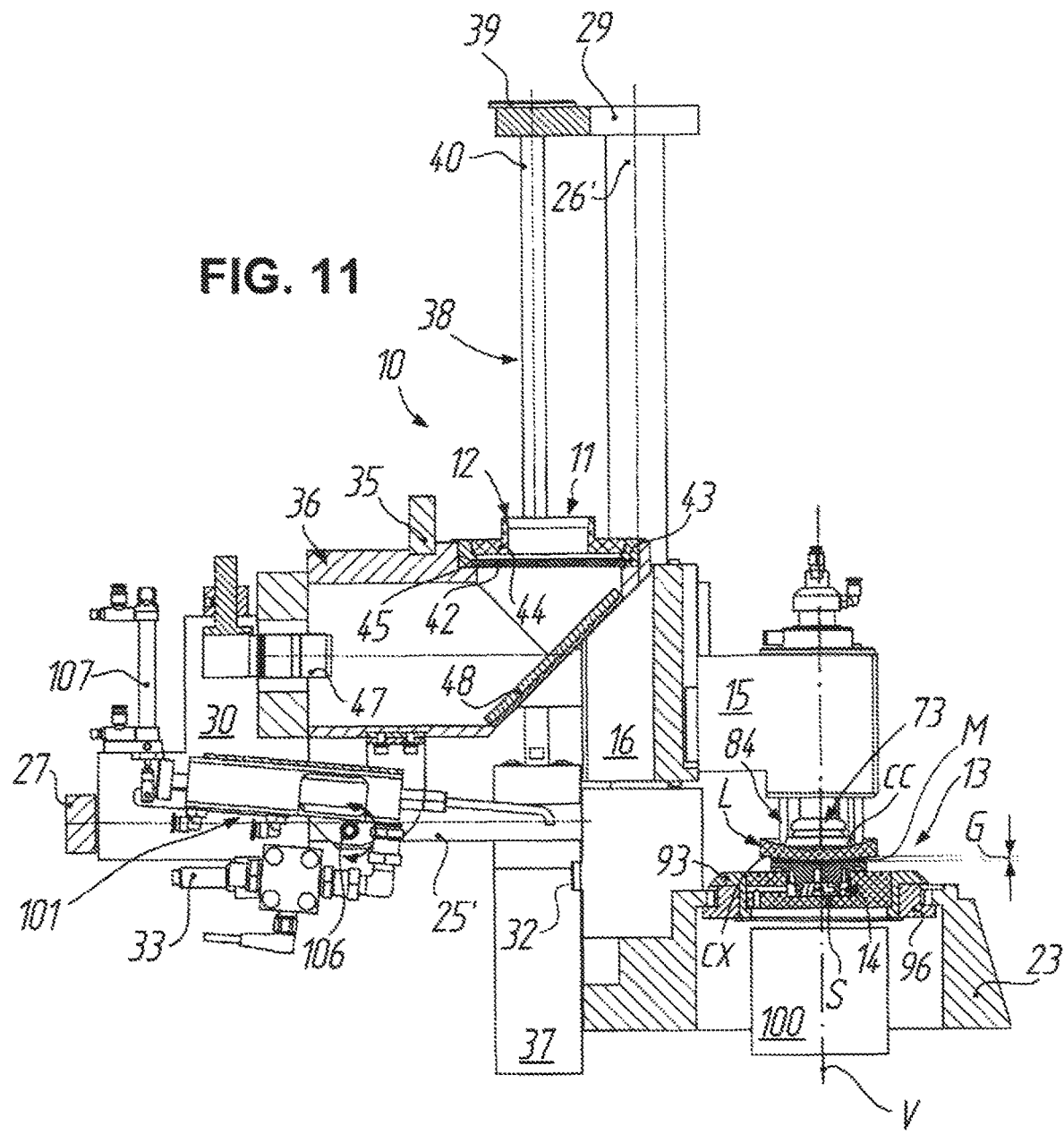
Figure 12:
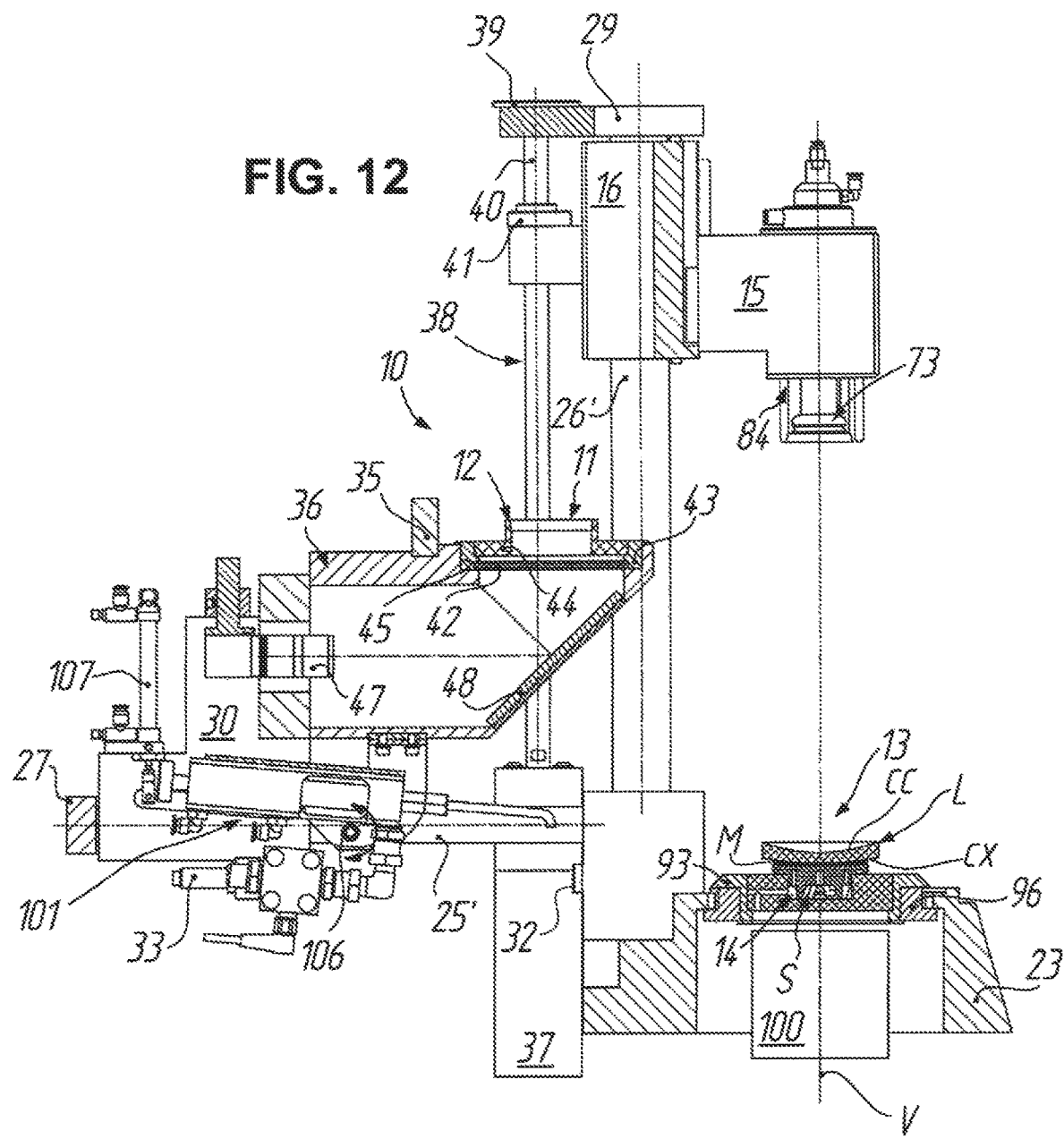
Figure 13:
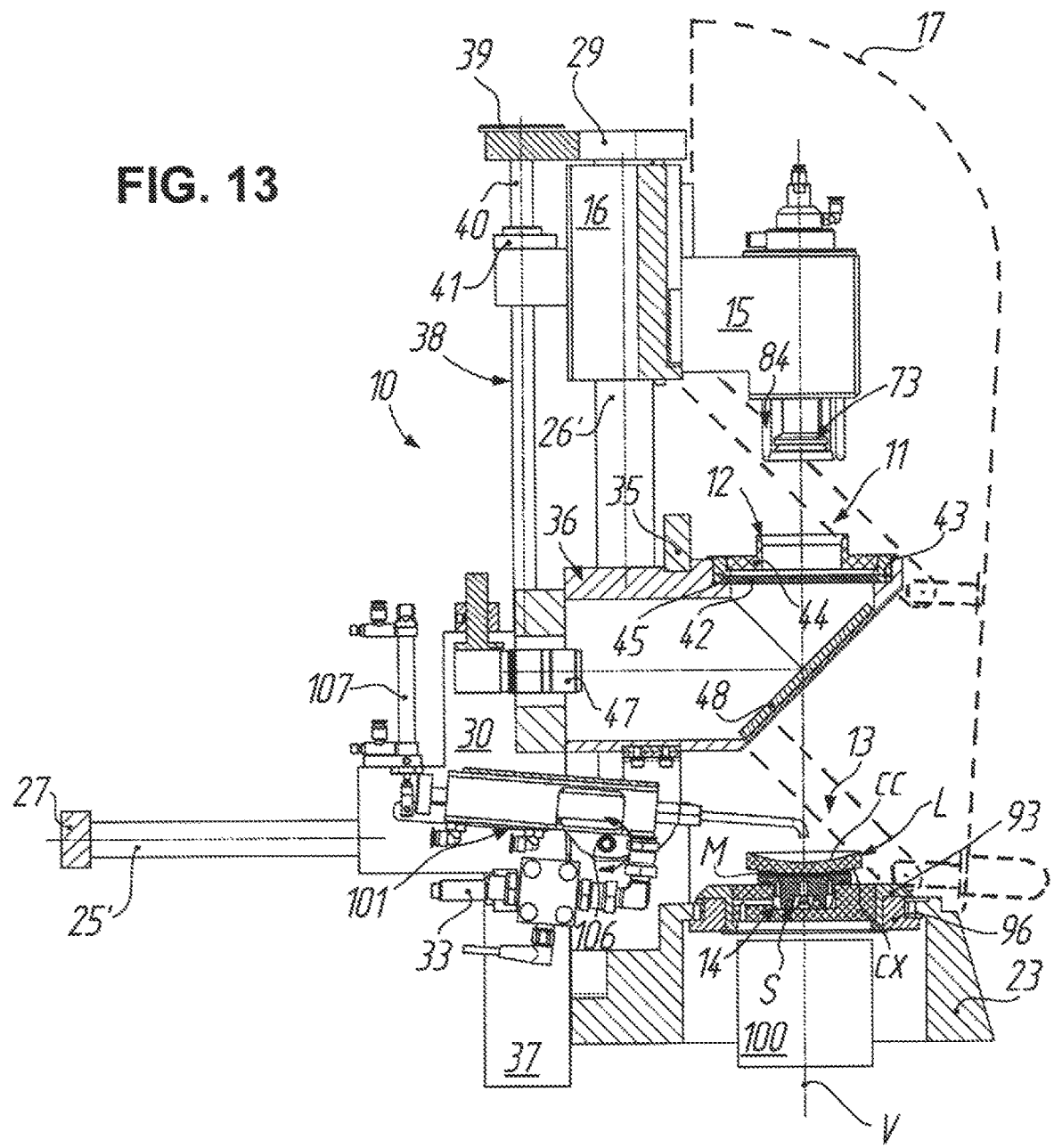

FIGS. 6 to 13 illustrate the sequence of the entire blocking process in chronological order, wherein after alignment of the spectacle lens L on the aligning station 11 (FIG. 6; see for that purpose also FIGS. 14 to 19 and the description with respect thereto) and fixing of the spectacle lens L in its aligned position by use of the holding-down device 68 in the holding head 15 (FIG. 7), the hood can be closed for initiation of automatic performance of the further process steps (FIG. 8). Application of the blocking material M to the block piece S by the metering device 101 and at the same time suction and counter-holding of the spectacle lens L by use of the suction device 73 and the counter-bearing arrangement 84 (FIG. 8) then take place, after which the holding head 15 is moved upwardly and application of the blocking material M is ended by tipping away the metering device 101 (FIG. 9). The station carriage 30 with the aligning station 11 and the metering device 101 is then moved rearwardly into its rest position (FIG. 10) before the holding head 15 with the spectacle lens L held thereat is moved in defined manner downwardly for the actual blocking process ("spatial blocking") and the spectacle lens L held positioned above the block piece S (FIG. 11), while the blocking material M is hardened by use of the exposure device 100. The holding head 15 thereupon releases the blocked spectacle lens L again and travels upwardly on the blocker axis V (FIG. 12), which frees the path for the station carriage 30 with the aligning station 11, which consequently can be moved forward again (FIG. 13). The process is now concluded and the hood can be pivoted up so that the user can remove the blocked spectacle lens L.

Figure 20:
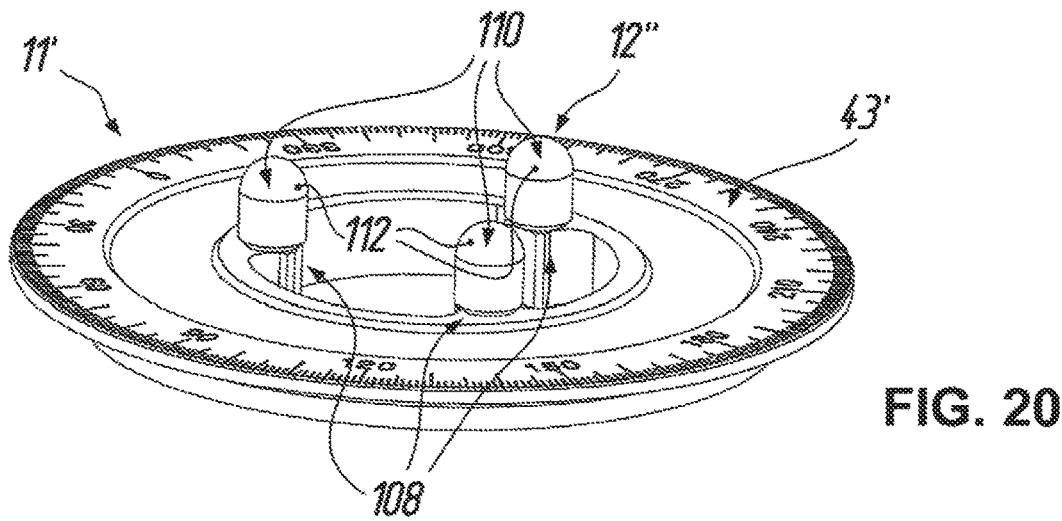
FIG. 20 shows a perspective view of an aligning station of the blocking device according to FIG. 1 in an embodiment, which is an alternative by comparison with the embodiment according to FIGS. 14 to 17, in which instead of a prism ring three support pins having an equal length for non-prismatic blocking are provided at a scale ring.
Figure 21:
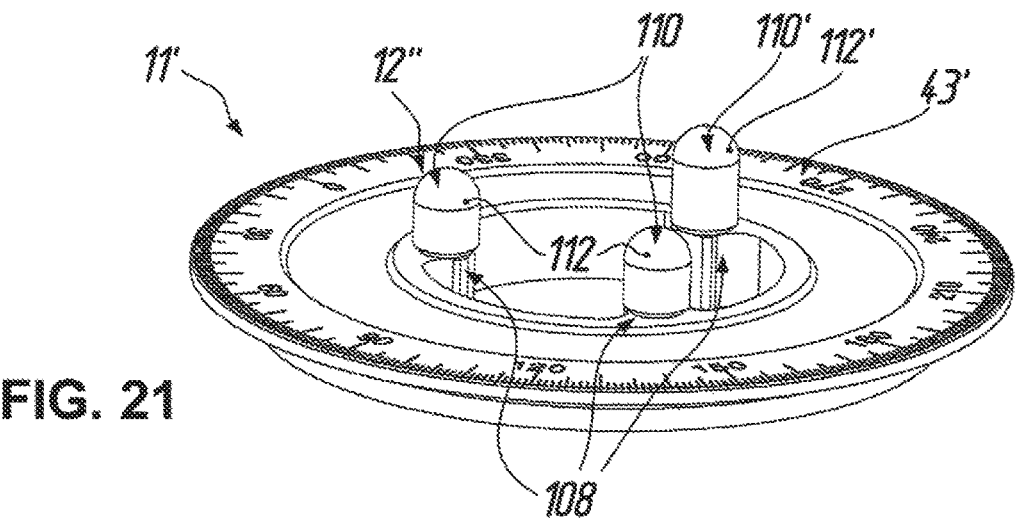
FIG. 21 shows a perspective view of the aligning station according to FIG. 20, in which the three support pins are of different length for prismatic blocking.
Figure 22:
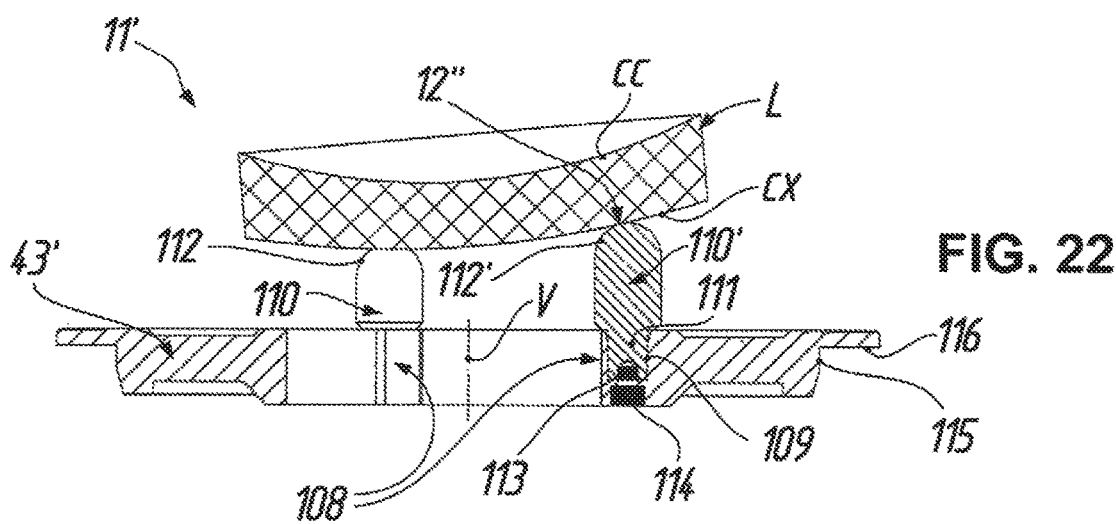
FIG. 22 shows a sectional view of the aligning station according to FIG. 21, in which the section runs through a center axis of the scale ring and the longest support pin and which illustrates an aligning process with a single-strength spectacle lens to be prismatically blocked.

Finally, FIGS. 20 to 22 show an alternatively embodiment of the aligning station 11', which shall be described in the following only to the extent that it differs from the aligning station 11 described above with reference to FIGS. 14 to 17.

The aligning station 11' comprises a scale ring 43', which is rotatably receivable in the stepped opening 45 of the station housing 36 (cf. FIG. 6) and which in comparison with the afore-described scale ring 43 is enlarged radially inwardly and provided at its inner circumference with three receiving projections 108 which are uniformly angularly spaced (120°) from one another as seen around the blocker axis V. Each receiving projection 108 is provided, starting from the upper side of the scale ring 43', with a receiving bore 109 (see FIG. 22) which extends parallel to the blocker axis V and which respectively serves for fastening a support pin 110 (or 110'). For that purpose, each support pin 110 has a receiving end 111 which is narrowed in diameter and which is insertable into the respectively associated receiving bore 109. At the opposite end, each support pin 110 has a hemispherical end section 112, wherein the hemispherical end sections 112 of all three support pins 110 in common form the workpiece support 12″ on which the spectacle lens L can be supported. It is evident that the support pins 110 (or 110′) thus form a defined three-point support, which is secure against tipping, for the spectacle lens L.

Whereas two of the support pins 110 are each secured, for example by an adhesive, in the associated receiving bore 109 of the scale ring 43′ the third support pin 110 is exchangeably retained in the associated receiving bore 109 so that it can be exchanged for a longer support pin 110′ as illustrated in FIGS. 21 and 22. As apparent from FIG. 22, through suitable selection of the length of the support pin 110′ it is possible to achieve a defined tilting of the spectacle lens L with respect to the blocker axis V. Here, again, a plurality of support pins 110′ of different length can be stocked so as to cover the desired range of prism angles for the blocking, for example stepped in terms of length for prism angles of 0° (all bearing pins 110, 110′ are of the same length, as shown in FIG. 20), 1°, 2°, 3°, etc.

In order to securely retain the exchangeable support pin 110′ in the associated receiving bore 109 and at the same time to enable expeditious manual exchange, the support pin 110′ is provided downwardly at the receiving end 111 with a magnet 113 which co-operates with a magnet 114 secured in the receiving bore 109 (or a ferromagnetic insert mounted there).

In the state of the scale ring 43′ in which it is mounted on the station housing 36 this ring is centered in the opening 45 of the station housing 36 by way of the circumferential surface 115 shown in FIG. 22, whereas the scale ring 43′ rests by an annular flange 116 on the station housing 36 at the top. A marking (not shown) applied to the station housing 36 enables, in co-operation with the markings on the upper side of the scale ring 43′, a defined rotational angle orientation of the scale ring 43′ about the blocker axis V so that the desired prismatic tilting in three dimensions can be oriented.

In a further variant, which is not illustrated, of the aligning station the design can be such that two of the three support pins can be moved by motor independently of one another along the longitudinal axis thereof, for example by use of piezo drives, so that in a (partly) automated aligning process both the prism angle and the rotational angle orientation of the tilt axis about the blocker axis V are settable by suitable movement of the two displaceable support pins.

A device for blocking workpieces comprises an aligning station, which has a workpiece support, for aligning a workpiece supported thereon, a blocking station, which comprises a block piece mount and in which the aligned workpiece can be blocked by a blocking material on a block piece mountable in the block piece mount to be centered with respect to a substantially vertically extending blocker axis, and a suitably guided and driven workpiece carriage, which carries a holding head for the workpiece and which transports the workpiece held at the holding head from the aligning station to the blocking station. The workpiece is positionable in defined manner along the blocker axis relative to the block piece mounted in the block piece mount and during the blocking can be held in the defined relative position with respect to the block piece while leaving a blocking material receiving gap between workpiece and block piece. In that case, the aligning station is movable from a rest position, in which it does not obstruct movements of the workpiece carriage, to a work position, in which the workpiece support is centered relative to the blocker axis, and conversely.

We claim:

1. A device for blocking workpieces either for material-removing or coating thereof, comprising
    an aligning station, which has a workpiece support, for alignment of a workpiece supported on the workpiece support,
    a blocking station which comprises a block piece mount and in which the aligned workpiece can be blocked by use of a temporarily deformable blocking material (M) on a block piece, which is receivable in the block piece mount to be centered with respect to a substantially vertically extending blocker axis, and
    a suitably guided and driven workpiece carriage which carries a holding head for the workpiece and which transports the aligned workpiece held at the holding head from the aligning station to the blocking station, positions the workpiece in a defined manner along the blocker axis relative to the block piece disposed in the block piece mount and during the blocking holds the workpiece in the defined relative position with respect to the block piece while leaving a blocking material receiving gap between the workpiece and the block piece,
    characterized in that the workpiece carriage together with the holding head for the workpiece is longitudinally movable along the blocker axis and capable of separate motion from the aligning station motion, whereas the aligning station is movable and capable of separate motion from the workpiece carriage in a direction transversely to the blocker axis from a rest position, in which it does not obstruct movements of the workpiece carriage, to a work position, in which the workpiece support is centered with respect to the blocker axis, and conversely from said work position to said rest position.

2. A device according to claim 1, characterized in that the aligning station is mounted on a suitably guided station carriage movable transversely to the blocker axis.

3. A device according to claim 2, characterized in that the station carriage for the aligning station is axially guided at substantially horizontally extending guide rods and is movable by a pneumatic cylinder onto end abutments which define the rest and work positions.

4. A device according to claim 3, characterized in that the workpiece support is formed by a prism ring, which is exchangeably mounted at the aligning station, from a plurality of differently chamfered prism rings, which ring can be oriented in rotational angle about the blocker axis by a scale ring fixedly mounted at the aligning station.

5. A device according to claim 1, characterized in that the block piece mount is constructed for mechanically positive mounting of the block piece and is capable of defined rotation about the blocker axis by use of a setting ring with a scale in the blocking station.

6. A device according to claim 2, characterized in that mounted on the station carriage is a camera which films the workpiece supported on the workpiece support of the aligning station along the blocker axis by way of a deflecting mirror, which is similarly mounted on the station carriage, when the aligning station is disposed in its work position.

7. A device according to claim 6, further characterized by the workpiece carriage being guided at substantially vertically extending guide rods and a stationary rotary drive for movement and positioning of the workpiece carriage being drivingly connected with a ball screw drive which comprises a rotatably mounted ball screw spindle engaged with a nut connected with the workpiece carriage to be secured against relative rotation.

8. A device according to claim 7, characterized in that the holding head is provided with a holding-down device for the workpiece supported on the workpiece support of the aligning station, wherein the holding-down device comprises a pneumatically actuable piston-cylinder arrangement with a piston rod, which is extendable in the direction of the workpiece and is aligned with the blocker axis and which at the end carries a pressure member for engagement with the workpiece.

9. A device according to claim 1, characterized in that the holding head comprises a suction device for holding the aligned workpiece by use of sub-atmospheric pressure, with an annular sucker lip which surrounds the blocker axis and which can be brought into contact with the workpiece supported on the workpiece support of the aligning station.

10. A device according to claim 9, characterized in that the sucker lip is tiltable with respect to the blocker axis by way of a spherical cap bearing arrangement mounted on an end of a sucker shank, which is mounted in the holding head to be longitudinally displaceable along the blocker axis and at the same time fixable in any axial relative setting with respect to the holding head.

11. A device according to claim 10, characterized in that the holding head comprises a counter-bearing arrangement for supporting the workpiece, which is held at the holding head, in its aligned position, wherein the counter-bearing arrangement has at least three pressure pins, which extend parallel to the blocker axis and are arranged to be distributed around it and which are longitudinally displaceable with respect to the holding head so as to each come into contact with the workpiece by an end protruding from the holding head and are fixable in the respective axial relative setting thereof with respect to the holding head.

12. A device according to claim 11, characterized in that the pressure pins are mounted in parallel arrangement with a plurality of cylinder pins in an annular space of the holding head, wherein provided for axial fixing of the pressure pins is a drive which pushes a wedge into place between adjacent cylinder pins in a direction transverse to the blocker axis.

13. A device according to claim 1, characterized by a metering device which applies the blocking material in a deformable state and in defined quantity to the block piece mounted in the block piece mount, wherein the metering device is movable together with the aligning station.

14. A device according to claim 13, characterized in that the metering device comprises a metering head which is movably mounted on the station carriage for the aligning station so that it is movable in the direction of and away from the block piece mounted in the block piece mount, wherein the blocking material can be fed in a position of the metering head near the block piece and the feed of the blocking material can be terminated under movement of the metering head away from the position near the block piece to a position remote from the block piece.

15. A device according to claim 1, characterized in that the block piece mount is formed to be at least partly transparent, wherein an optical exposure device by which the blocking material can be optically exposed for hardening is arranged below the block piece mount on the blocker axis.

16. A device according to claim 1, characterized in that the workpiece support is formed by a prism ring, which is exchangeably mounted at the aligning station, from a plurality of differently chamfered prism rings, which ring can be oriented in rotational angle about the blocker axis by a scale ring fixedly mounted at the aligning station.

17. A device according to claim 1, characterized in that mounted on the station carriage is a camera which films the workpiece supported on the workpiece support of the aligning station along the blocker axis by way of a deflecting mirror, which is similarly mounted on the station carriage, when the aligning station is disposed in its work position.

18. A device according to claim 1, characterized in that provided for movement and positioning of the workpiece carriage, which is guided at substantially vertically extending guide rods, is a stationary rotary drive drivingly connected with a ball screw drive which comprises a rotatably mounted ball screw spindle engaged with a nut connected with the workpiece carriage to be secured against relative rotation.

19. A device according to claim 1, characterized in that the holding head is provided with a holding-down device for the workpiece supported on the workpiece support of the aligning station, wherein the holding-down device comprises a pneumatically actuable piston-cylinder arrangement with a piston rod, which is extendable in the direction of the workpiece and is aligned with the blocker axis and which at the end carries a pressure member for engagement with the workpiece.

20. A device according to claim 1, characterized in that the holding head comprises a counter-bearing arrangement for supporting the workpiece, which is held at the holding head, in its aligned position, wherein the counter-bearing arrangement has at least three pressure pins, which extend parallel to the blocker axis and are arranged to be distributed around it and which are longitudinally displaceable with respect to the holding head so as to each come into contact with the workpiece by an end protruding from the holding head and are fixable in the respective axial relative setting thereof with respect to the holding head.

* * * * *